United States Patent [19]
Lappington et al.

[11] Patent Number: 5,519,433
[45] Date of Patent: May 21, 1996

[54] INTERACTIVE TELEVISION SECURITY THROUGH TRANSACTION TIME STAMPING

[75] Inventors: John P. Lappington, Lawrenceville, Ga.; Susan K. Marshall, Greenwood Village; Wayne Y. Yamamoto, Aurora, both of Colo.; Cameron A. Wilson, Marietta, Ga.; Eric C. Berkobin, Woodstock, Ga.; Richard S. Simons, Duluth, Ga.

[73] Assignee: Zing Systems, L.P., Englewood, Colo.

[21] Appl. No.: 160,079

[22] Filed: Nov. 30, 1993

Related U.S. Application Data

[63] Continuation-in-part of Ser. No. 796,085, Nov. 20, 1991, Pat. No. 5,343,239.

[51] Int. Cl.$^6$ .................................................. H04N 7/08
[52] U.S. Cl. ........................... 348/2; 348/10; 348/12; 348/13; 348/478; 455/2; 455/5.1
[58] Field of Search ............................. 348/1, 6, 10, 12, 348/13, 2, 4, 460, 461, 473, 474, 478, 500, 476; 455/2, 3.1, 3.2, 4.1, 4.2, 5.1, 6.3; 346/20, 80; H04N 7/00, 7/08, 7/087, 7/16, 7/14, 7/173, 7/20, 7/22, 7/10

[56] References Cited

U.S. PATENT DOCUMENTS

| | | |
|---|---|---|
| 3,359,655 | 12/1967 | Audebert . |
| 3,599,221 | 8/1971 | Baer . |
| 3,606,688 | 9/1971 | Zawels et al. . |
| 3,641,685 | 2/1972 | Zawels et al. . |

(List continued on next page.)

FOREIGN PATENT DOCUMENTS

| | | | |
|---|---|---|---|
| 0267085A1 | 10/1987 | European Pat. Off. | .......... G07F 7/10 |
| 0338936A1 | 4/1989 | European Pat. Off. | ........ G06F 15/44 |
| 0399897A1 | 5/1990 | European Pat. Off. | .......... H04H 9/00 |
| 1287304 | 8/1972 | United Kingdom . | |
| 2154344 | 9/1985 | United Kingdom . | |
| 2246262 | 1/1992 | United Kingdom . | |

OTHER PUBLICATIONS

"This Just In—TV Answer: Interactive Device Below $500", HFD, The Weekly Home Furnishings Newspaper, 1 page, date unknown.
"Marketing Update—TV Answer: New and Improved", Interactive World, 1 page, Nov. 1992.
"New Boss Lehman Challenges Staff To Come Up With Best TV Answer", The Washington Times, 2 pages, Friday, Nov. 20, 1992.
"TV Answer Closer To Starting Gate", Direct, 2 pages, Jan. 1993.
TV Answer New Summary, 5 pages, Feb. 1993.
TV Answer—Applications, 4 pages, Feb. 1993.
TV Answer—Personal TV Unit, 2 pages, Feb. 1993.
"Changing The Way America Uses Television", TV Answer, 1 page, 1993.
TV Answer—Service Providers, 2 pages, 1993.
TV Answer—Backgrounder "The Birth of an Industry:Interactive Video and Data Service", 2 pages, Apr. 1993.
TV Answer—Background "The Transmission/Reception Path", 1 page, Apr. 1993.

(List continued on next page.)

*Primary Examiner*—David E. Harvey
*Attorney, Agent, or Firm*—Fliesler, Dubb, Meyer & Lovejoy

[57] ABSTRACT

A system for providing security on an interactive television system. Two sets of interactive data, with time stamps, are separately sent to a remote location. At the remote location, the time stamps are checked against a remote clock, a time difference being noted for both sets of data. The two time differences are compared to determine if one set of data has been delayed as compared to the other. Non-delayed data can be used to update a game score for an interactive game. After the game is completed, the remote clock is compared to a central clock. The difference between the two clocks are compared to the time difference for non-delayed data to determine whether the entire aggregate of interactive data was delayed.

54 Claims, 22 Drawing Sheets

U.S. PATENT DOCUMENTS

| | | |
|---|---|---|
| 3,936,595 | 2/1976 | Yanagimachi et al. . |
| 4,108,361 | 8/1978 | Krause . |
| 4,424,532 | 1/1984 | den Toonder et al. . |
| 4,592,546 | 6/1986 | Fascenda et al. . |
| 4,593,904 | 6/1986 | Graves . |
| 4,745,468 | 5/1988 | Von Kohorn . |
| 4,755,871 | 7/1988 | Morales-Gerza et al. ............. 348/13 |
| 4,805,020 | 2/1989 | Greenberg . |
| 4,876,592 | 10/1989 | Von Kohorn . |
| 4,910,775 | 3/1990 | Yves et al. ............... 380/25 |
| 4,926,255 | 5/1990 | Von Kohorn . |
| 4,943,963 | 7/1990 | Waechter et al. ............ 370/94.1 |
| 4,956,709 | 9/1990 | Richer et al. . |
| 4,977,455 | 12/1990 | Young . |
| 5,013,038 | 5/1991 | Luxenberg et al. . |
| 5,034,807 | 7/1991 | Von Kohorn . |
| 5,057,915 | 10/1991 | Von Kohorn ............... 358/84 |
| 5,073,931 | 12/1991 | Audebert et al. ............ 380/23 |
| 5,073,934 | 12/1991 | Audebert et al. ............ 380/23 |
| 5,083,800 | 1/1992 | Lockton . |
| 5,093,718 | 3/1992 | Hoarty et al. . |
| 5,093,921 | 3/1992 | Bevins, Jr. . |
| 5,113,440 | 5/1992 | Harney et al. . |
| 5,120,076 | 6/1992 | Luxenberg et al. . |
| 5,125,028 | 6/1992 | Naito . |
| 5,128,752 | 7/1992 | Von Kohorn . |
| 5,136,644 | 8/1992 | Audebert et al. ............ 380/25 |
| 5,150,407 | 9/1992 | Chan . |
| 5,161,188 | 11/1992 | Pires . |
| 5,227,874 | 7/1993 | Von Kohorn . |
| 5,249,044 | 9/1993 | Von Kohorn . |
| 5,283,734 | 2/1994 | Von Kohorn . |
| 5,297,205 | 3/1994 | Audebert et al. ............ 380/23 |

OTHER PUBLICATIONS

TV Answer—Profile "Corporate Profile", 1 page, Apr. 1993.

TV Answer—Press Release "TV Answer's Interactive Technology Adopted By Montgomery, Zukerman, Davis, Inc. For Inclusion In Client's Marketing Mix", 2 pages, Apr. 5, 1993.

TV Answer—Press Release "TV Answer And Griffin Promotions To Create Interactive Marketing Programs", 2 pages, Apr. 5, 1993.

TV Answer—News Release "TV Answer Teams With Road Runner Sports, Inc. For Easy Fitness Wear Ordering Via Interactive Television", 2 pages, Apr. 12, 1993.

TV Answer—News Release "TV Answer and PBS Team Up To Enhance Viewer Service Through Interactive Television", 2 pages, Apr. 19, 1993.

TV Answer—Press Release "TV Answer And DMGT Corp. Form Alliance To Add Interactive Television To Direct Marketers' Service Options", 2 pages, Apr. 22, 1993.

TV Answer—News Release "TV Answer Lets Consumers Order Exercise Equipment Via Interactive Television Without Missing A Beat Of Their Workout As a Result Of Agreement With Fitness Quest", 2 pages, May 19, 1993.

TV Answer—News Release "Jerrold Communications And TV Answer Announce Plans To Provide Interactive Services For TV Answer's Cable Affiliates", 3 pages, Jun. 7, 1993.

TV Answer—Backgrounder "TV Answer: More Than Just Interactive Television", 1 page, Jun. 1993.

"PBS And TV Answer Team To Bring Interactivity To Public Television", Transactions, 8 pages, Jun. 1993.

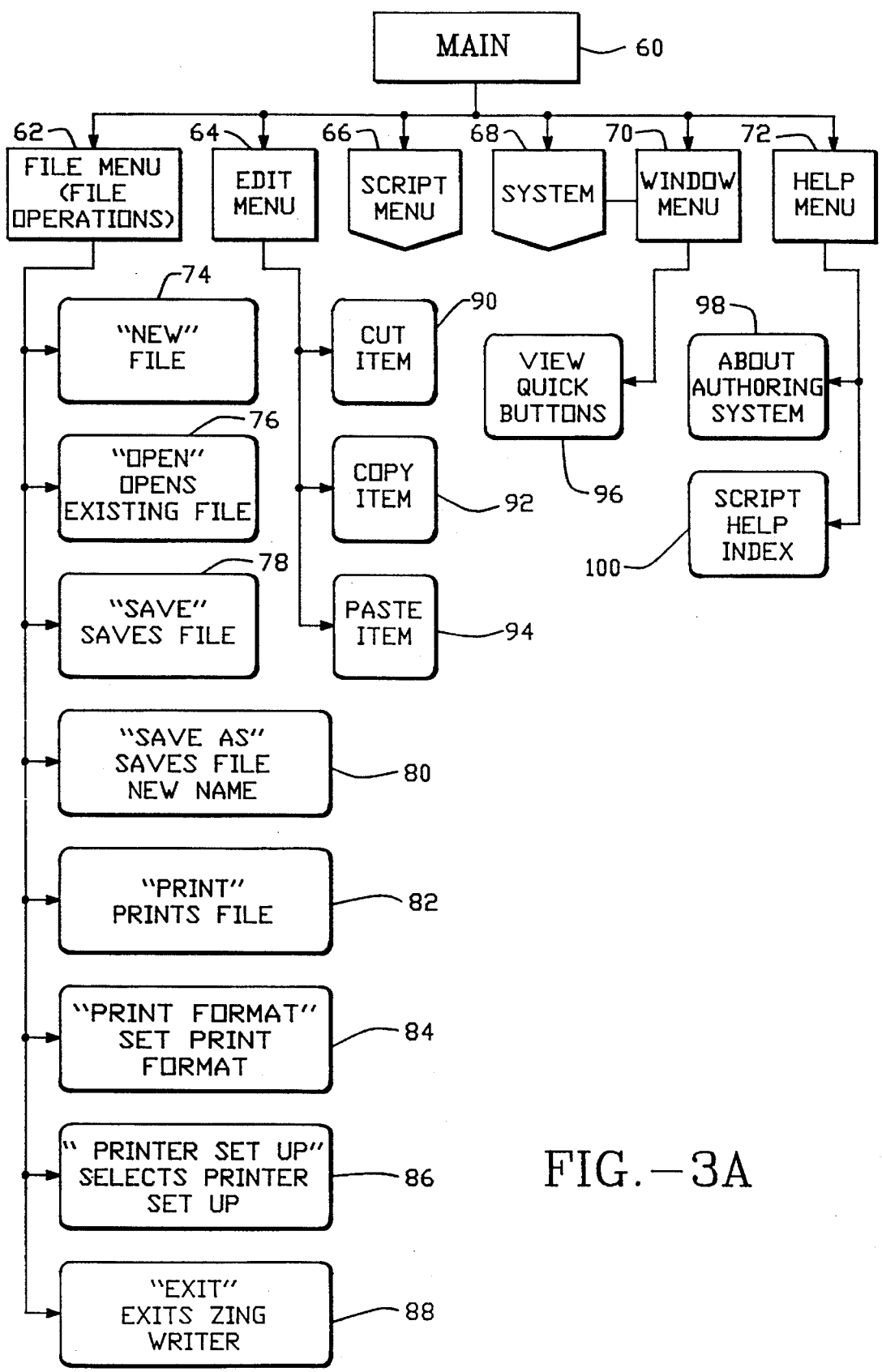
FIG.—3A

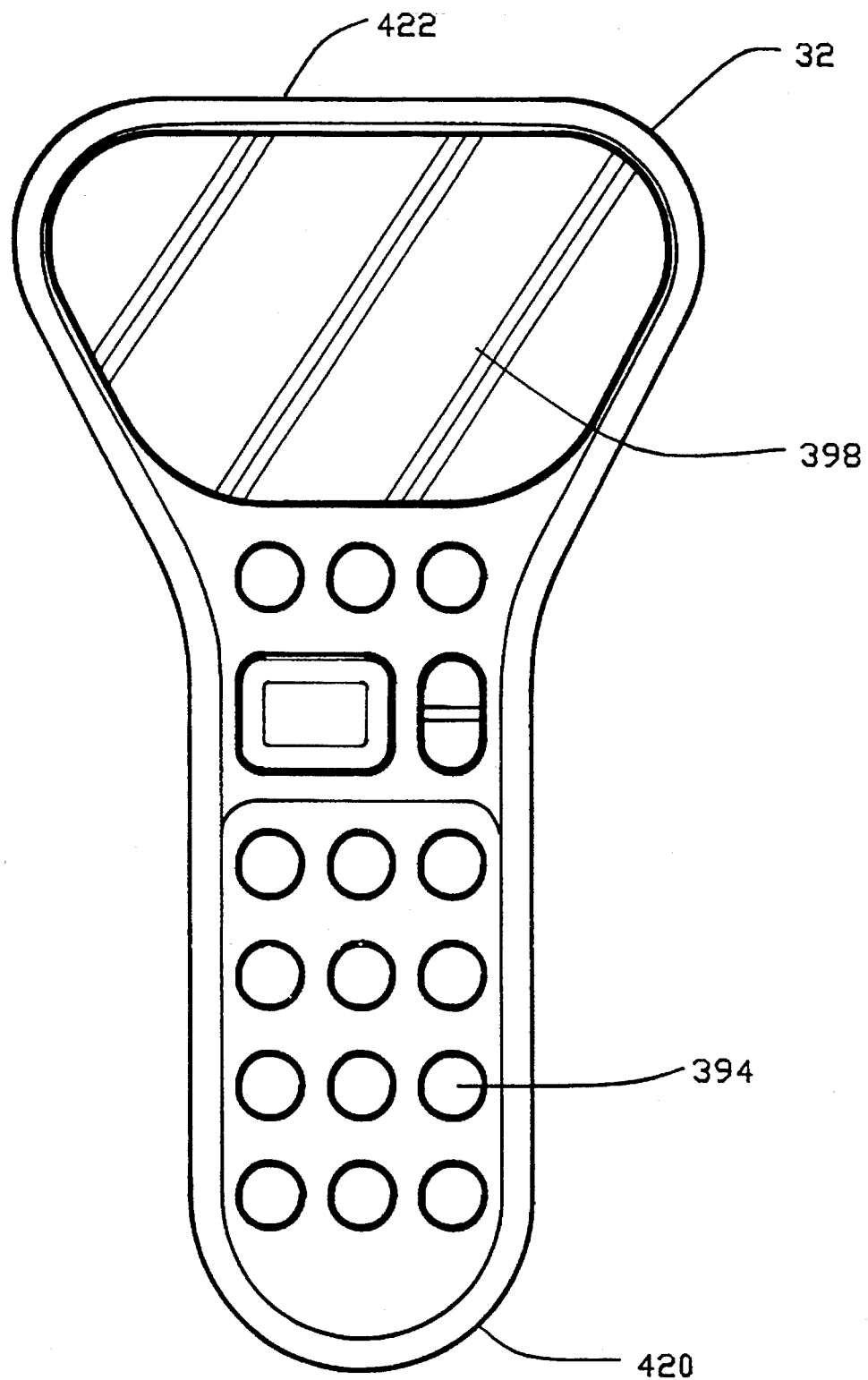
FIG.−11

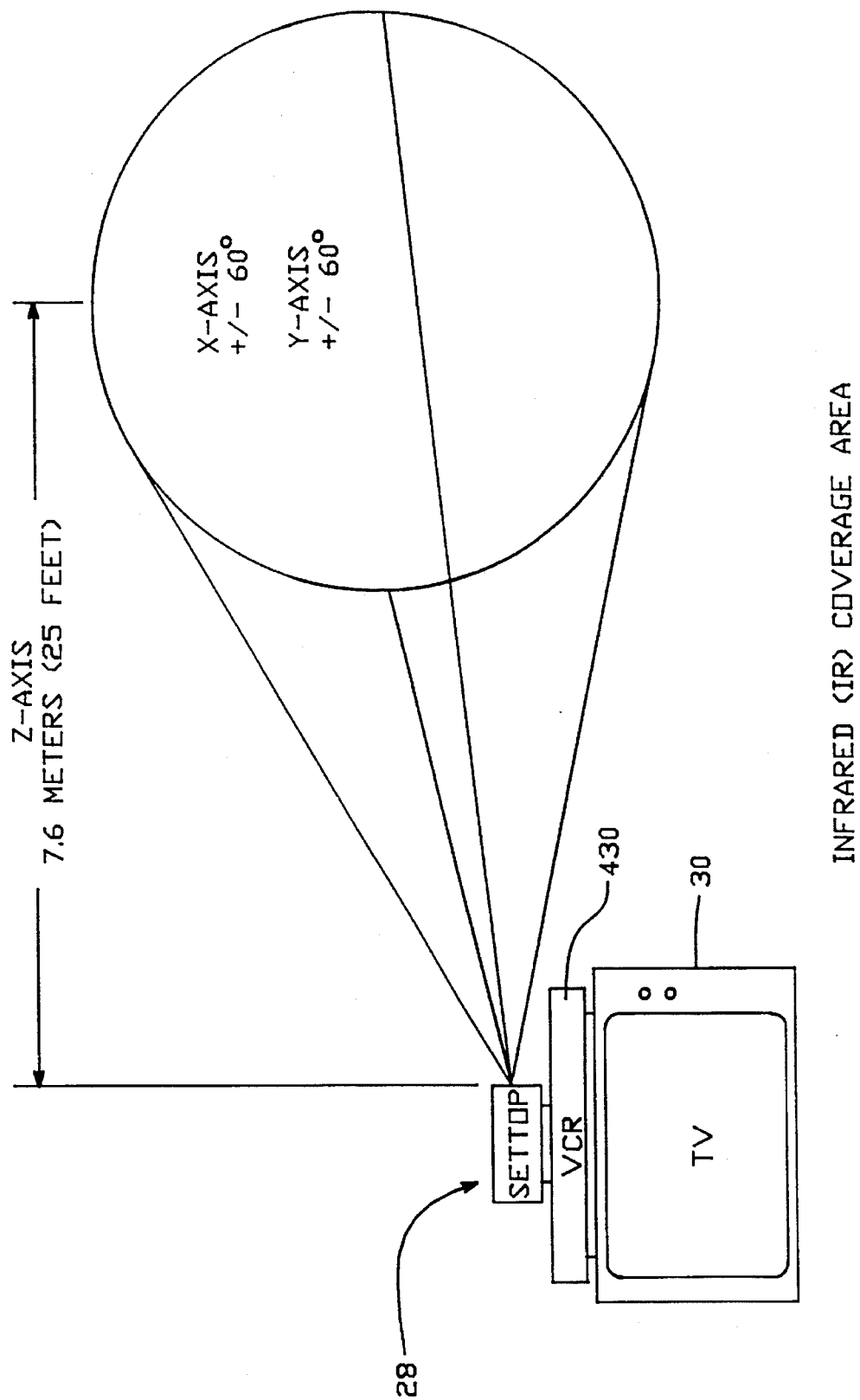
FIG.-12　INFRARED (IR) COVERAGE AREA

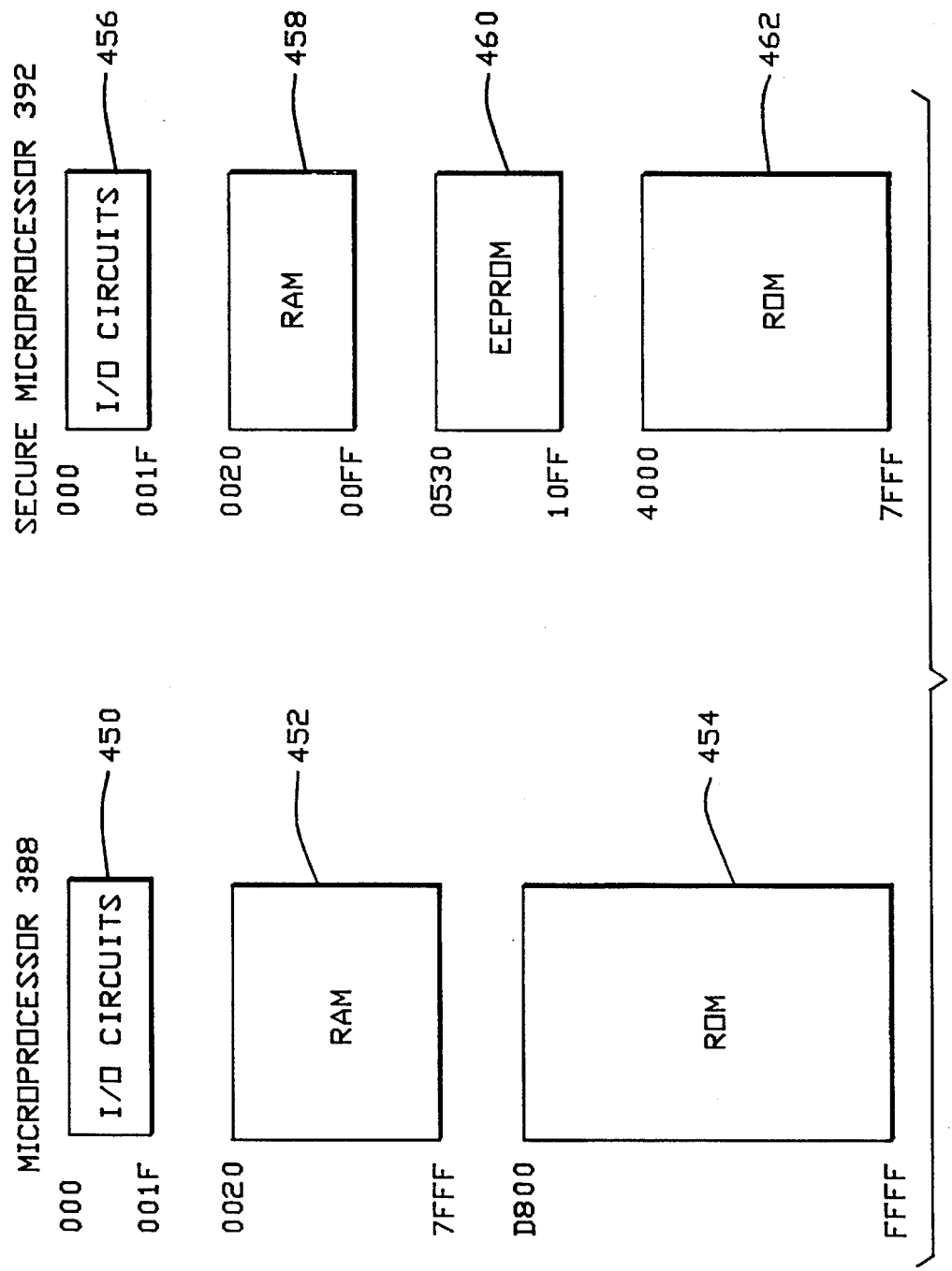
FIG.—13

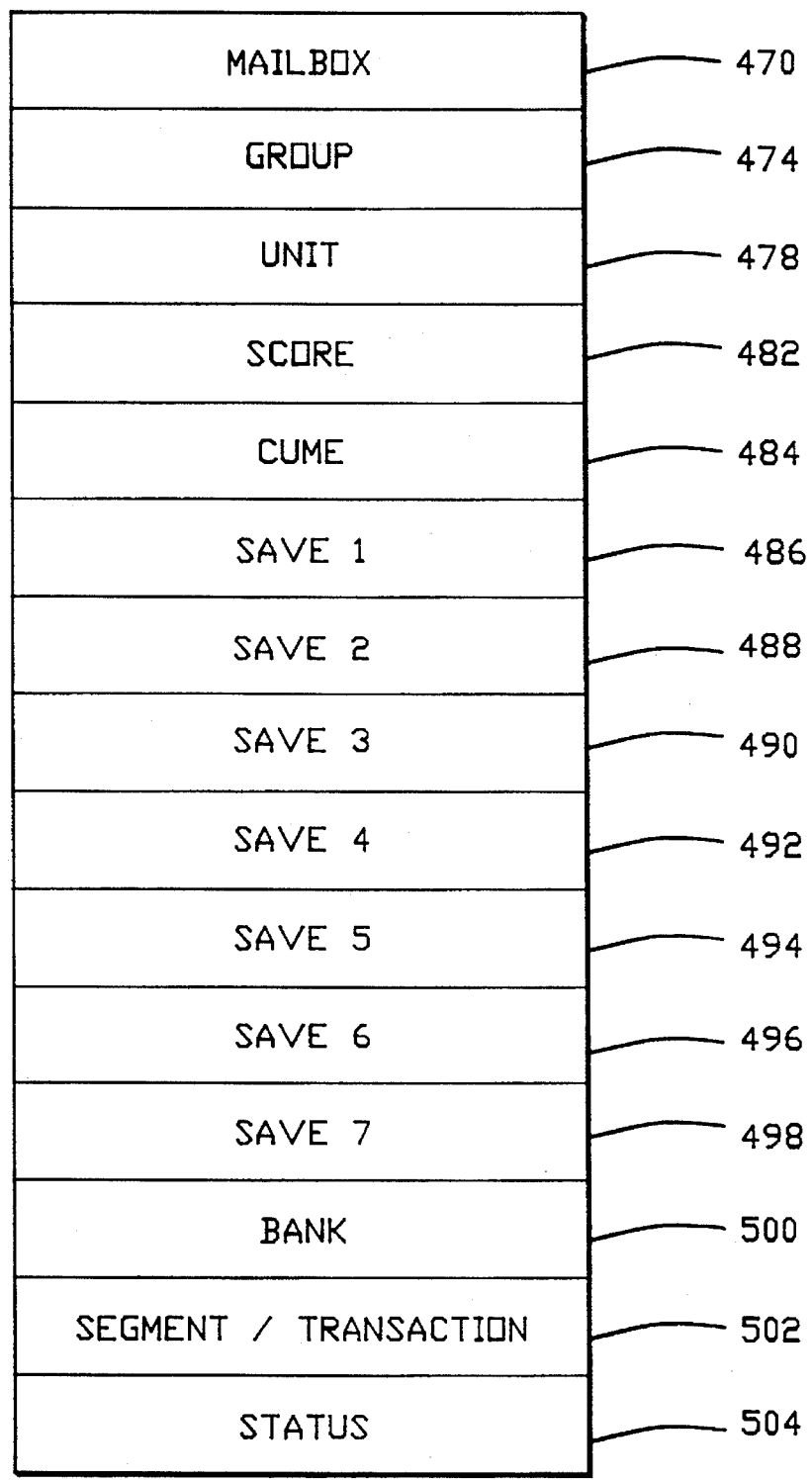
FIG.—14

| REGISTERS: | INPUT | POINTS | SCORE | CUME |
|---|---|---|---|---|
| QUESTION:<br>25 PTS. Y/N:<br>DO LIONS HIBERNATE?<br><br>THE HANDHELD DISPLAYS THE QUESTION AND THEN WAITS FOR CONSUMERS TO ENTER AN ANSWER. | | | FOR THIS EXAMPLE WE WILL ASSUME THAT THE CONSUMER'S CURRENT SCORE IS 75 POINTS. | FOR THIS EXAMPLE WE WILL ASSUME THAT THIS SCRIPT IS THE SECOND GAME OF A SERIES; THEREFORE, THE CUME REGISTER IS EQUAL TO THE SCORE REGISTER PLUS THE SCORE FROM THE FIRST GAME. |
| WRONG:<br>NO. LIONS LIVE IN WARM CLIMATES AND HAVE NO NEED TO HIBERNATE.<br>CONSUMERS WHO ENTER YES WILL SEE THIS RESPONSE MESSAGE. | 1 | 0<br>IF INPUT IS EQUAL TO 1, NO POINTS ARE EARNED. | 75<br>75 + 0 = 75<br>THE SCORE REGISTER IS UPDATED BY THE ADDITION OF THE POINTS REGISTER. | 575<br>575 + 0 = 575<br>THE CUME REGISTER IS UPDATED BY THE ADDITION OF THE POINTS REGISTER. |
| RIGHT:<br>RIGHT! 25 PTS.<br>CONSUMERS WHO ENTER NO WILL SEE THIS RESPONSE MESSAGE. | 2 | 25<br>IF INPUT IS EQUAL TO 2, THEN 25 POINTS ARE EARNED. | 100<br>75 + 25 = 100<br>THE SCORE REGISTER IS UPDATED BY THE ADDITION OF THE POINTS REGISTER. | 600<br>575 + 25 = 600<br>THE CUME REGISTER IS UPDATED BY THE ADDITION OF THE POINTS REGISTER. |

FIG.-15

INTERACTIVE TELEVISION SECURITY THROUGH TRANSACTION TIME STAMPING

CONTINUATION APPLICATION INFORMATION

This Application is a continuation-in-part of application Ser. No. 07/796,085, filed Nov. 20, 1991, now U.S. Pat. No. 5,343,239.

CROSS-REFERENCE TO RELATED APPLICATIONS

This application is related to the following application, which is assigned to the assignee of the subject application:

"TRANSACTION BASED INTERACTIVE TELEVISION SYSTEM", inventors John P. Lappington Susan K. Marshall, Wayne Y. Yamamoto, and Cameron A. Wilson, Application SC/No. 08/159,930, filed Nov. 30, 1993.

Both of the above related applications are incorporated herein by reference.

BACKGROUND OF THE INVENTION

1. Field of the Invention

The present invention is directed to maintaining security in an interactive television system. Particularly, the interactive television system is adapted for use with existing broadcast, cable, and satellite television or radio or other communication systems for allowing participants and viewers to interact with the system in order, by way of example only, to shop, enter into games of skill, and engage in educational presentations and other events where information is provided and the participant or viewer can make an appropriate response thereto.

2. Description of the Related Art

Many interactive television products have been introduced that provide the capability for the viewer to participate in television programs. These products accept cue signals transmitted to handheld devices that measure and control the response of the viewers as the viewers participate in the program. Some of these devices implement hardware that monitors the response or the results of responses accumulated over time and reports the results to a central site. One of the early embodiments of this technology was the QUBE interactive two-way television system introduced by Warner Communications at least as early as 1982. Other systems include the INDAX system field tested at least as early as 1984 by Cox Communications.

The interactive television products currently known fall generally within one of two categories. The first category includes systems having firmware in a remote participant's handheld device such that the participant can start playing along with the interactive program as soon as the programs begins. Such a system has limited capabilities in regard to supporting multiple varieties of interactive programs due to the size limitation and permanence of the firmware. The second category maintains the software in random access memory in the viewer's handheld device such that the program must be downloaded into the device prior to the event starting. This process may take up to five minutes, requiring the participant to wait prior to participating in the interactive program. Both categories of devices are designed to work with one interactive program at a time, where the participant must complete that program before being able to participate in a new program.

When the above described products are compared to the television viewing habits of most viewers, significant deficiencies are apparent. Most viewers do not continuously watch one program. Viewers generally switch between several channels. This is so pervasive in the industry that the terms "grazing" and "surfing" have been given to the habit of switching between channels during the programs.

None of the prior art interactive systems allow for interactive programs to be presented concurrently on different television channels so that a viewer may change channels ("graze" or "surf") during the middle of a first interactive program and join a second interactive program already in progress. This would also be a useful feature for a viewer who turns on the television late or who wants to take part in more than one program that overlaps. For example, a viewer may want to play along with a football game but interact with an educational program during halftime. Or, if the viewer starts playing one game and realizes that he or she does not like the program, then the viewer can change channels and join a second program that is already in progress.

Furthermore, the prior art system requires a viewer to schedule an interactive program in order for the system to download the program and tune to the correct television signal, or the viewer must tune the interactive system to the correct channel. Thus, if a viewer wishes to change programs (or surf) the viewer must change the television tuner and the interactive television system tuner.

Accordingly, an interactive system concept that is compatible with the participants viewing habits is required for interactive television to be successful. This system must include the ability to interleave (or surf between) several interactive programs at the same time and not require a significant amount of advance downloading of programs or initialization information. When the viewer tunes the channel, the viewer should almost immediately be able to participate in the interactive program either if the viewer is for the first time watching that program or the viewer is returning after watching some other program for a brief or extended period.

In the situation where a viewer returns to a program that was previously watched, the interactive game should continue, leaving out only the part that was missed. Any cumulative score for the part of the event actually participated in should be maintained. The result should be the same as if the missed questions were not answered.

The interactive systems described above and others being introduced into the marketplace contemplate allowing the viewers to play, for example, a game of chance or other game where the viewer's response is scored. The scoring is eventually used to determine whether the viewer has achieved a certain success level and is deserving of a prize. Alternatively, an interactive system may contemplate having a viewer enter survey responses where certain responses or methods of responding will make the viewer eligible for a prize. Prizes could be awarded to attract more viewers to play interactive games or as a promotion for a consumer product or service. However, if valuable prizes are awarded, for example, airline tickets, automobiles and electronic appliances; viewers will have an incentive to falsify and inflate their score.

The general problem arises when the transmitted signal is delayed by taping with a VCR or other technique. A typical interactive program could include displaying a message, asking a question, answering the question, revealing the correct answer and rewarding the viewer with points based on the viewer's answer. If a viewer had access to a live feed and was able to receive the transmitted questions and answers at the handheld from a delayed source, the viewer could know the answers to the questions before they were asked by the handheld. The handheld would not know that the interactive program was delayed and would treat it as any other game. This would enable the viewer to fool the handheld and receive a score higher than the viewer deserved.

SUMMARY OF THE INVENTION

The present invention is directed to overcome the disadvantages of the prior art.

It is, therefore, an object of the present invention to provide for an interactive television system that guards against cheating. It is also the intent not to unduly restrict the use of the system in order to achieve this result.

As described above, delaying transmitted signals can potentially compromise an interactive system. The only difference between the actual and the delayed interactive data signal is the absolute transmission time. A defense against such an attack would involve knowledge of the absolute time by the handheld. If the handheld knew the absolute time, it could check an embedded time stamp in the received interactive data against the absolute time to see if it were valid. If data was received that did not match the current absolute time, the handheld would know that it was delayed and treat the data accordingly.

The security system of the present invention includes a time stamping technique that uses, preferably, an internal handheld clock and an imbedded time stamp within the interactive data. The time stamp would be generated by a data insertion system based on a real time clock. If the handheld clock were required to always be synchronized to the actual time, the handheld could determine if the received interactive program was live or taped. However, to require that the handheld clock be synchronized to the actual time is difficult for several reasons. First, crystals precise enough to keep the actual time over an extended time period would be expensive. Second, the handheld clock would have to be factory set and periodically reset through some sort of registration procedure. And third, the tolerance of the handheld clock would place restrictions on the type of question that could be asked. For example, if the interactive program required the viewer to guess whether a strike or a ball will be pitched during a baseball game, and the tolerance of the handheld clock was plus or minus 15 seconds, a viewer could still cheat using a transmitted signal delayed by five or ten seconds. Typical crystals can drift by as much as two to three minutes over a single year which would further restrict the type of questions that could be asked in an interactive game.

The suggested solution to this problem is not to rely on absolute time but to rely on relative times. The handheld would keep track of the difference between the handheld clock and a reference clock. The reference clock would be monitored by reading a time stamp embedded in the interactive data. The difference between the embedded time stamp and the handheld clock would be compared for successive sets of interactive data, to determine whether one of the sets is delayed as compared to the other. This comparison enables the handheld terminal to determine which scores to eliminate and which scores to add to the cumulative score. Eventually, the difference between the handheld clock and the time stamp must be compared to the difference between the handheld clock and the actual reference clock used to generate the time stamp. This is done when the handheld score is registered. For example, through coded numbers, a viewer can telephone a central operator and report the current value of the handheld clock and the score to determine whether the score was generated by live interactive data, and thus valid. This process could, of course, be automated through appropriate software.

In one embodiment of the present invention, the method for providing security for interactive television comprises the steps of receiving interactive data for a first transaction (or unit of interactive data), the interactive data including a first time stamp based on a central clock. A remote clock is then read and a first delta is calculated. The first delta represents the first time stamp subtracted from the remote clock. The process is then repeated for a second transaction; therefore, obtaining a second delta. A discrepancy is then calculated equal to the first delta subtracted from the second delta. If the discrepancy is greater than a first time drift constant, then the second transaction was delayed as compared to the first transaction. If the discrepancy is less than the negative of the first time drift constant, then the first transaction was delayed as compared to the second transaction. If the absolute value of the discrepancy is less than the first time drift constant, than neither transaction is delayed in relation to the other. Furthermore, if the discrepancy is greater than the first time drift constant, the delta from the first transaction is stored as a stored delta. If the discrepancy is not greater than the first time drift constant, the stored delta is equal to delta from the second transaction.

The remote clock is read for a third time and the time difference is calculated between the central clock and the third remote clock value. A time offset is calculated equal to the stored delta subtracted from the time difference so that the cumulative score is determined to be valid if the absolute value of the time offset is less than or equal to a second time drift constant.

Another embodiment of the present invention comprises means for receiving interactive data having a time stamp based on a central clock. The system also includes a remote clock and timing means for comparing the time stamp to the remote clock. Comparison means, based on the timing means, determines whether a first subset of the interactive data is delayed as compared to the second subset of the interactive data. Presentation means, based on the first subset of data, presents the transaction to the viewer and scores the viewer's response. The system may include a means for sending the cumulative score of an interactive program to a central location to verify whether the interactive data was received in a delayed manner based on a comparison of the central clock with the remote clock. Verification means, based on the comparison means, the central clock and the remote clock, determines if the interactive data was delayed. If the interactive data was determined not to be delayed, then the cumulative score is valid.

In yet another embodiment of the present invention, the method for providing security includes inserting a time stamp, based on a central clock, into a first set of interactive data. The first set of interactive data is then sent to a remote location. The remote location has a remote clock so that a first delta can be determined for the first set of interactive data. The first delta being equal to the difference between the time stamp and the remote clock. The first delta is compared to a delta of a second set of interactive data to determine if the first set of interactive data is delayed as compared to the second set of interactive data. A remote delta and remote clock value are then received. The remote delta is the same value as the first delta if the first set of interactive data is not delayed as compared to the second set of interactive data. A time difference is determined between the central clock and the remote clock value. The time difference is compared to the received delta in order to determine whether the interactive data was delayed.

BRIEF DESCRIPTION OF THE DRAWINGS

FIG. 3A is a flow chart and block diagram explaining the Main Menu of the Authoring System.

FIG. 11 depicts a top plan view of the handheld.

FIG. 12 depicts a representation of the infrared coverage area for the present invention.

FIG. 13 is a Memory Map for the handheld.

FIG. 14 is a block diagram of a programmer table.

FIG. 15 depicts an example of how the registers in the handheld are updated during a transaction.

DESCRIPTION OF THE PREFERRED EMBODIMENTS

I. System Overview

Figure 1:
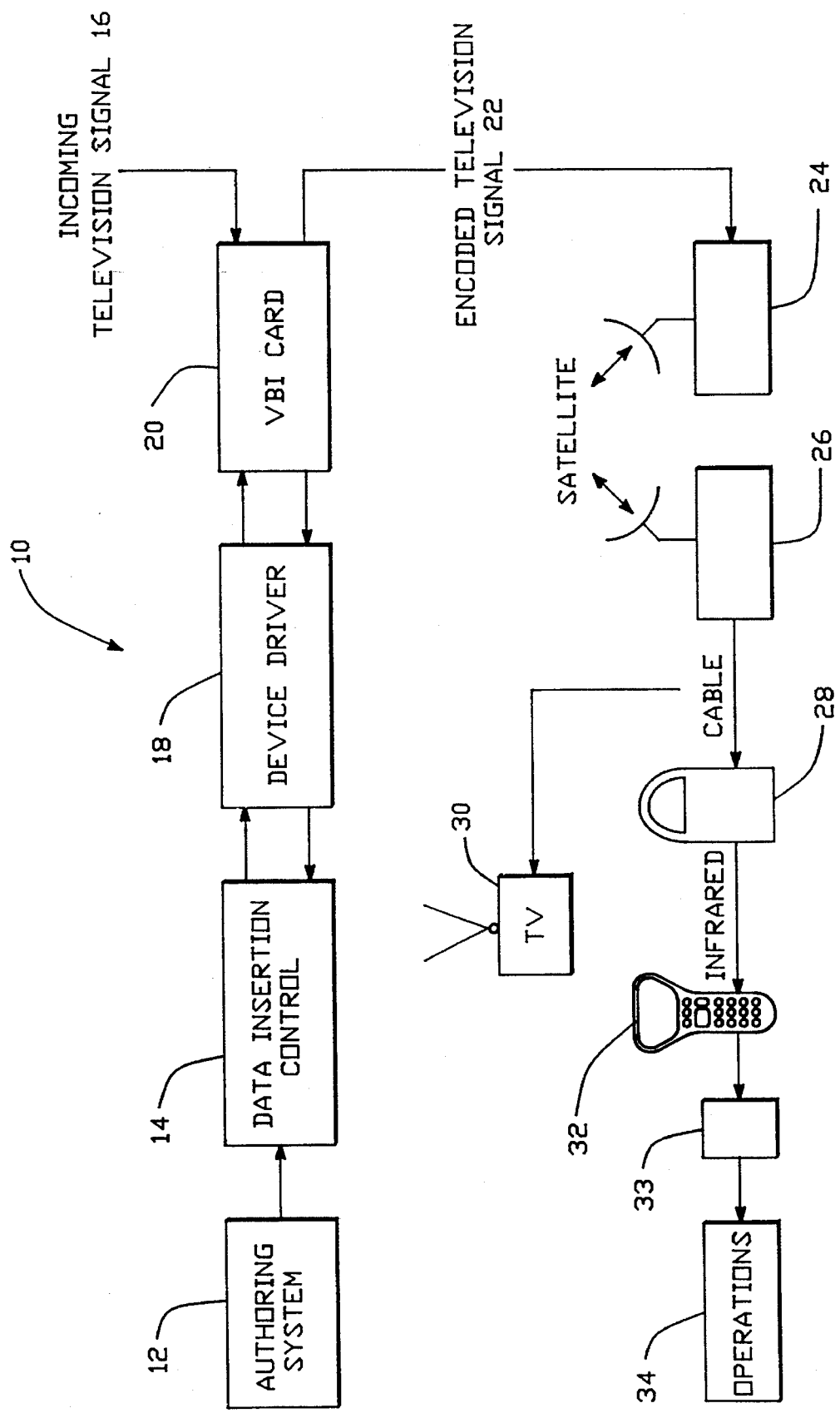
FIG. 1 depicts a block diagram of the interactive television system.

FIG. 1 shows interactive system 10. An authoring system 12 is used to create/program interactive data. That is, a programmer (also called a script writer) develops a set of questions or informational statements to be sent to a viewer during a television broadcast. Questions could also be accompanied by responses, response criteria and/or scoring criteria. The script writer could also determine when during the broadcast the questions should be transmitted and presented, and how a question will fit into an overall game or series. A script writer using authoring system 12 creates commands and event specific data, which are used to present the interactive program to a viewer.

After a script writer creates the interactive program, the interactive data is first sent to data insertion control 14, which controls the insertion of interactive data preferably into the vertical blanking interval ("VBI") of incoming television signal 16. Television signal 16 can be, for example, a show to be aired on a network such as a sitcom or baseball game. Insertion control 14 utilizes Insertion Card 20 to insert the interactive data onto television signal 16.

There are four different modes for inserting data onto the VBI. The first mode is a straight insertion. Interactive data is designed using authoring system 12 and is sent to data insertion control 14, which places it immediately into the VBI of television signal 16 to create encoded signal 22. Encoded signal 22 can be immediately transmitted to home viewers or video taped. A second mode is to pre-produce the interactive data with time data. Data insertion control 14 would insert the interactive data onto the VBI at the appropriate time. Third, the information could be pre-produced for real time insertion into a live event. In this situation the data would be stored in a memory device and an operator would, via a control panel, signal when a given transaction should be encoded on to the VBI. Finally, it is contemplated that interactive data could be designed and synchronized to a specific video frame.

Insertion Card 20 adds (or encodes) the interactive data to the VBI lines of television signal 16, and sends the encoded television signal 22 to a transmitter, all at the direction of data insertion control 14. Data insertion control 14 is responsible for processing, scheduling, time stamping and validation, as well as administrative functions associated with data insertion. Device driver 18 serves as an interface between Insertion Card 20 and data insertion control 14. In an alternative embodiment, rather than using the VBI lines, interactive data could be transmitted using the audio portion of a television signal, luminance, digital packets or radio communication.

Encoded television signal 22 can be sent from satellite transmitter 24 and received by a satellite receiver 26. It is contemplated that satellite receiver 26 could be part of a cable system where the signal received by satellite receiver 26 is then sent via cable TV to home viewers. Instead of using a satellite and a cable system, the television signal could be broadcast using a standard television transmitter, transmitted using straight cable without satellites or transmitted with any other means for transmitting a television signal.

The signal received by satellite receiver 26 is sent to the home viewer where it is received by television set 30 and settop device/converter 28. Television 30 plays the original television program. Settop device 28 receives the encoded television signal and strips out the interactive data. Settop device 28 sends the interactive data by infrared transmission to handheld 32, which presents the interactive program to the home viewer. Thus, while the home viewer watches TV 30, the viewer can participate in the interactive program presented on handheld 32. Although infrared transmission is preferred, any other means for transmission will suffice; for example, radio communication or a wire. Transmission via infrared or radio is preferred so many viewers, each with their own handheld, can participate simultaneously.

Upon completion of an interactive program the viewer could register his/her score with operations 34, which would be a central or regional office for collecting scores, survey information, etc. Registering can be accomplished utilizing many alternatives. The preferred method for registering scores includes handheld 32 transmitting, via infrared communication, the registration information to dialer 33. After receiving the registration information, dialer 33, which includes a modem, sends the information to operations 34.

Alternative methods for registering scores include a home viewer reading a code from handheld 32 to an operator over conventional telephone lines, the viewer inputting a code into a central computer using the touch tone keys on the telephone, or including a modem inside handheld 32 so that handheld 32 can communicate over the telephone lines with a computer at operations 34. It is also contemplated that a viewer could contact operations 34 via a radio signal, cable or another communication medium.

Figure 2:
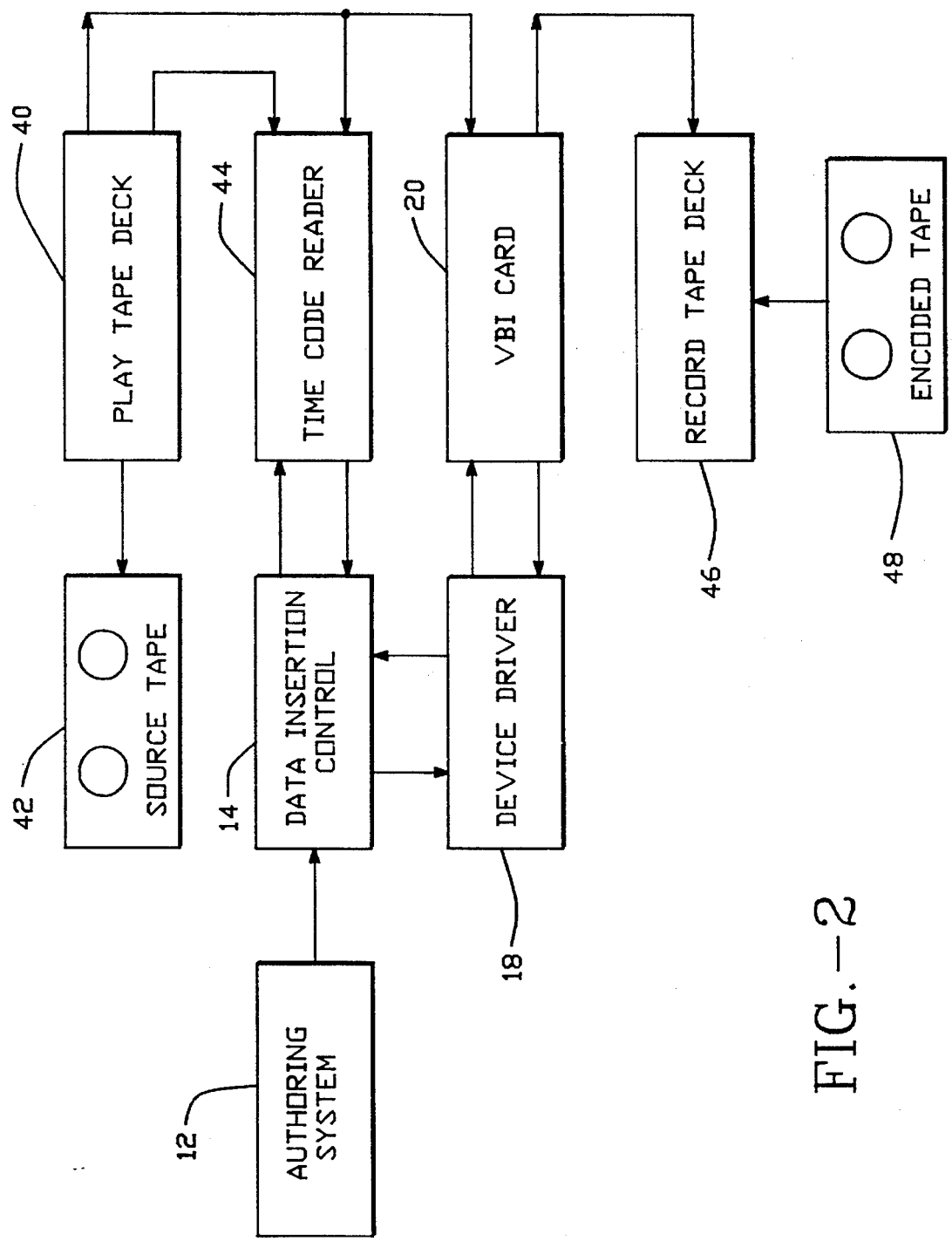
FIG. 2 depicts a partial block diagram of the interactive television system configured for adding interactive data to a videotape.

FIG. 2 shows the interactive system configured to add an interactive program to a pre-existing television signal that is on a video tape or equivalent. Play tape deck 40 is used to play source tape 42, which contains the pre-recorded television program. Play tape deck 40 can be used to read time codes from source tape 42 or there can be a time code generator inserted between the play tape deck 40 and the time code reader 44. Time code reader 44 reads the timing information in order to determine when data may be inserted, and transmits this information to data insertion control 14. As described with respect to FIG. 1, data insertion control 14, in conjunction with device driver 18 and Insertion Card 20, inserts interactive data into the signal emanating from source tape 42. The encoded signal is sent to record tape deck 46 and recorded on encoded tape 48, which will contain the pre-recorded television program plus the interactive data. Encoded tape 48 can then be stored for later broadcast.

When a television program (live or pre-programmed) with interactive data is broadcast, the interactive data will be transparent to viewers that do not have the interactive system. That is, someone without handheld 32 will not know that an interactive data is being presented.

Each of the components described above in regard to FIG. 1 will be discussed in more detail below.

II. Authoring System

As described above, the authoring system is the software application used to create interactive programs. The preferred embodiment authoring system 12 is a computer (IBM PC 386 or 486, or any other programmable computer) using authoring system software (a windows application) that generates interactive data including commands and event specific data. While the script writer is designing an interactive program, a script file is created that includes an English-like description of the various questions and answers etc., for an interactive program. Authoring system 12 includes a two part compiler. During the first phase of the compilation, a symbolic file is created from the script file. The symbolic file is analogous to source code associated with a typical computer program. During the second phase of the compilation, an object file is created from the symbolic file. The object file contains commands and event specific data that is read by the data insertion system. The commands could be part of a proprietary high level command language or any other assembly-like commands.

When the interactive program is at the creation stage, on authoring system 12, it is called a script. The fundamental building block of a script is called a scripit. A scripit is a stand alone element that does not require another script to function. Examples of scripits include messages, questions, responses, criteria, and tables (to be explained below). An aggregate of scripits make up a script.

A transaction is the compiled version of a scripit or group of scripits which is time oriented. That is, all the data for a transaction is sent to handheld 32 at one time. Examples of transactions include messages, questions, responses, scoring criteria, branching conditions or a combination thereof. A group of one or more transactions make up a segment. A segment is a group of transactions that must be played sequentially. For example, a segment may include a transaction asking a question, a transaction disclosing the correct answer, a transaction scoring the viewer's response, a transaction providing the viewer with feedback or a combination thereof. Each transaction is numbered so that the first transaction in a segment is assigned a transaction number of one.

Thus, a script writer designs a script, and the script is compiled and broken down into a series of transactions which are sent to handheld 37. There are several types of scripts which can be designed separately or in combination, for example: standard mode, live events, polling, program or series, mini-games, or pay-per-play. A standard mode script can be either encoded onto a video tape or sent to data insertion 14 to be inserted in the VBI of a television signal in accord with the timing information programmed by the script writer. Live event scripts are to be used with live events, for example, sports, news and talk shows. With a live mode script, the script writer has selected text but does not insert timing information into the script. Rather, the script writer just sends a transaction at the appropriate time.

A polling script allows an opportunity for viewers to talk back to their television. Polling scripts gather information from the audience, including who they are, where they are and what they like. A polling script is used in conjunction with viewers calling in their scores. Applications include a teaser for news and talk shows. For example, a script could ask questions related to the next episode and then provide the poll results at the beginning of the next show. Or, the polls can be used as a comparison device, asking viewers questions, then later revealing where their opinions rank in relation to other viewers. It can also be used to rate the programs on a particular network and voice their opinions on what types of programming they would prefer. Finally, it can be used as a source for market research, verifying viewership and audience demographics.

Series scripts allows a number of individual games to be grouped into a series. This allows a programmer to devise on-going games in which player's scores can accumulate from game to game with a running tally (cumulative score) stored in handheld 32. An example of a series script is a interactive program designed to be played along with all seven games of the world series.

Mini-games are complete games (groups of one or more segments) within a script. Mini-games allows the viewer to play self-contained games within games. For example, a game show may have 3 contests during the program. Each contest could be a mini-game. Mini-games have unique properties and conditions that make them integral and useful parts of scripts, such as not automatically updating the cumulative score after each transaction or segment. The script writer can choose to update the cumulative score with the mini-game score at the completion of the mini-game, or save the mini-game score to be used for another mini-game. For example, if a script is being developed for a football game, the script writer can choose to report the viewer's scores by quarters. At the end of each quarter, the accumulated points for the quarter will be posted to the total.

Special programs or series can be designated as pay-per-play events. Interactive programs created for pay-per-play programming are only available to viewers who pay pre-registration fees. A special access code given to viewers who pay the fee allows handheld 32 to receive the transactions that are a part of the pay-per-play event. The pay-per-play feature can be used to create high stakes competitions as well as for premier and special events. Such programs utilize the event specific programmer tables, discussed below.

Scripts can be written with different levels of play which can be sent simultaneously to all handhelds 32. This feature allows a programmer to tailor scripts to different skills, ages and interests. Viewers chose their game level and then receive questions only for that level of play.

A script has three main components: messages, questions, and responses. Messages are text displayed on handheld 32 that do not require input from the viewer. Messages can introduce a show or provide information about the program. For example, a message may state, "Hello, welcome to the Super Bowl." Questions are text that request input from the viewer. There are preferably six types of questions: Yes/No, True/False, Multiple Choice, Integer, Decimal, and Fill In The Blank.

Responses are scoring methods and messages, based on an answers entered by a viewer. For example, if the viewer correctly answers a multiple choice question, the viewer could be awarded 25 points and a message would be displayed stating, "Great, you earned 25 points." In the preferred embodiment, there are preferably seven response options from which to choose: Quick and Easy, Multiple Replies, Closest, Count Down, Save Into, Threshold, and In-Range.

Quick and Easy displays one message for a right answer and one message for a wrong answer. Multiple Replies can display a unique message for each answer, with up to seven possibilities. For example, a question may have three acceptable answers, with one of the answers worth more points. The script writer can design a scripit such that a different reply message and point value will be given for each of the three answers. Closest includes one response for answers in a predetermined range and one response for answers out of the range. When scoring an answer for a question using the Closest option, variable points are awarded based on distance from the right answer. The closer a viewer's answer is to the correct answer, the more points the viewer receives. For Count Down, there is one message for the right answer and one answer for all others. Variable points are awarded based on the amount of time a viewer takes to input the correct answer. The faster a viewer answers a question, the more points are received.

With the Save Into option, no message is displayed for an answer. Rather, the answer is stored in a register for future use. The threshold option awards points and displays a message when the viewer correctly answers a predetermined number of questions. For example, if the viewer is playing along with Jeopardy and guesses 8 out of 10 questions correctly, the viewer will be awarded points. For In Range responses, there is one message for answers within a predetermined range and another message for answers outside the range. The predetermined range is programmed by the script writer.

Every script is uniquely identified by a combination of three numbers: mailbox number, group number and unit number. This identification structure is one of the features which allows viewers to switch or surf between programs while ensuring that the handheld 32 maintains the information associated with each interactive program.

An affiliate is the owner and/or producer of a script, who may hire a script writer (or be the script writer) to create a script and who would pay for the air time to broadcast a script. Examples of affiliates include but are not limited to, networks, advertisers, production companies or sporting event organizers.

Handheld 32 stores scores, opinions and other data in memory units called programmer tables. Each affiliate is assigned a number of programmer tables according to the particular affiliate's needs so that no two affiliates can use the same programmer table. The mailbox number is a unique number assigned to each of the affiliate's programmer tables. The authoring system 12 only allows an affiliate to create interactive programs which utilize programmer tables assigned to that affiliate.

The group number assigned to a script identifies the group (or series) of scripts to which the script belongs. This number is stored in the programmer table. For many scripts, one episode is its own group; therefore, the group number assigned to it is unique. However, the interactive system has the capability to combine the scores of a series of scripts. The group number must be the same for each script in the series so that handheld 32 knows which series the script belongs to.

The unit number assigned to a script is important when the script is a part of a series. The unit number must uniquely identify each episode of a series, and is stored within the assigned programmer table. When the script is a stand-alone script (e.g. not part of a series) the unit number is usually set to one. Scripts that are a part of a series have the same group number and preferably mailbox number so that scores from the various games in a series can be accumulated in a single register. Alternatively, multiple programmer tables, each with it's individual mailbox number, can be used with the individual scripts or programs of a series such that the score registers (discussed below) of each programmer table is added together. Each script is differentiated from the others in a series by its unique unit number. When a new script is sent on the VBI, handheld 32 checks the assigned programmer table to determine whether the group number from the previous script is the same or different from the current script. If the group number is the same, the handheld 32 will assume that the current script is a part of a series.

FIGS. 3A–3E are flow charts depicting how the authoring system is used to create a script. Authoring system 12 has a main menu 60 which offers six sub-menus: file menu 62, edit menu 64, scripit menu 66, system menu 68, window menu 70, and help menu 72.

If a script writer selects the file menu 62, the script writer is given eight options. The script writer can choose to create a "new" file 74, which enables a script writer to create a new script. The script writer can also choose to open an existing script 76. The script writer can save a script 78 if that script has already been saved before. If this is the first time the script writer is saving the script, the script writer would select "save as" 80. Print 82 allows the script writer to print the script file, and print format 84 allows the script writer to print the script file setting the format. Printer setup 86 allows the script writer to select the printer set-up parameters, and exit 88 allows the script writer to exit the authoring system software.

The edit menu 64 allows the script writer to cut 90, copy 92 or paste 94 text. The system menu 68 allows the script writer to enter script information, for example, the name of a script and author. The script writer can also define prestored messages or pre-stored questions, define defaults and name or re-name any variables or registers. Window menu 70 allows the script writer to view quick buttons 96, which are icons that, when selected, perform functions that normally would take more than one action. Help menu 72 includes information about the authoring system 80 and an index 100 to that information.

Figure 3B:
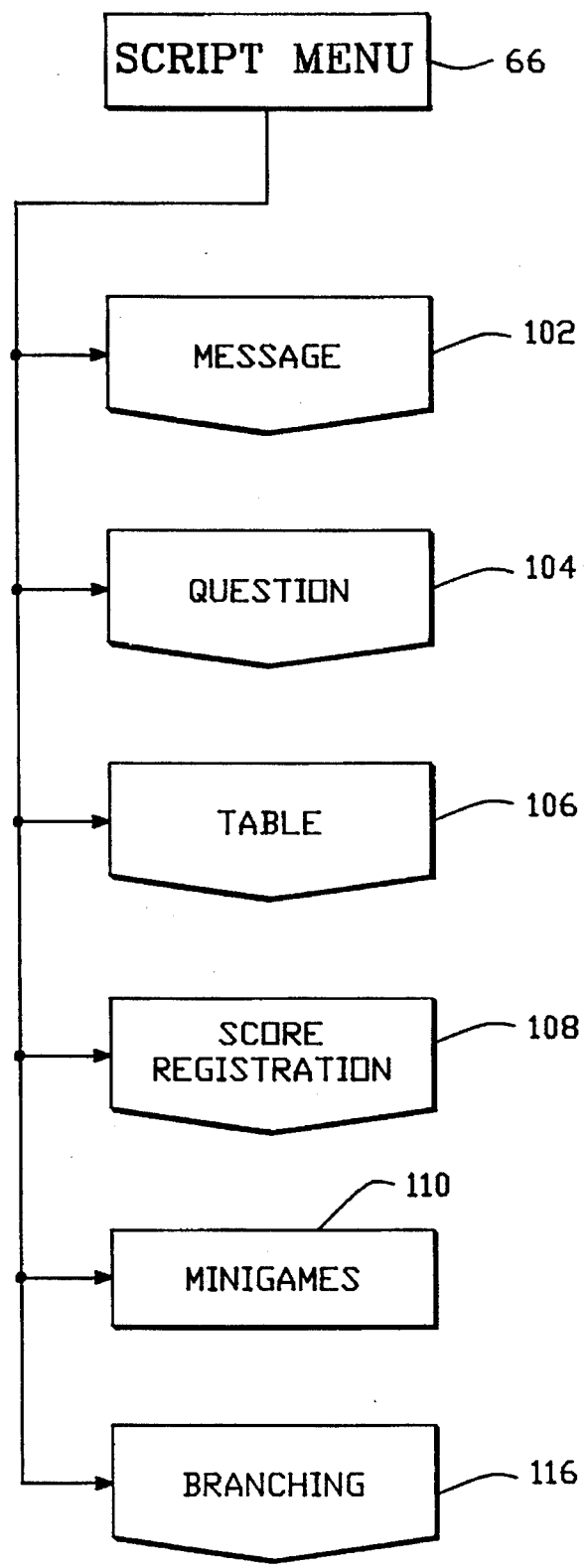
FIG. 3B is a flow chart and block diagram explaining the Script Menu of the Authoring System.
Figure 3C:
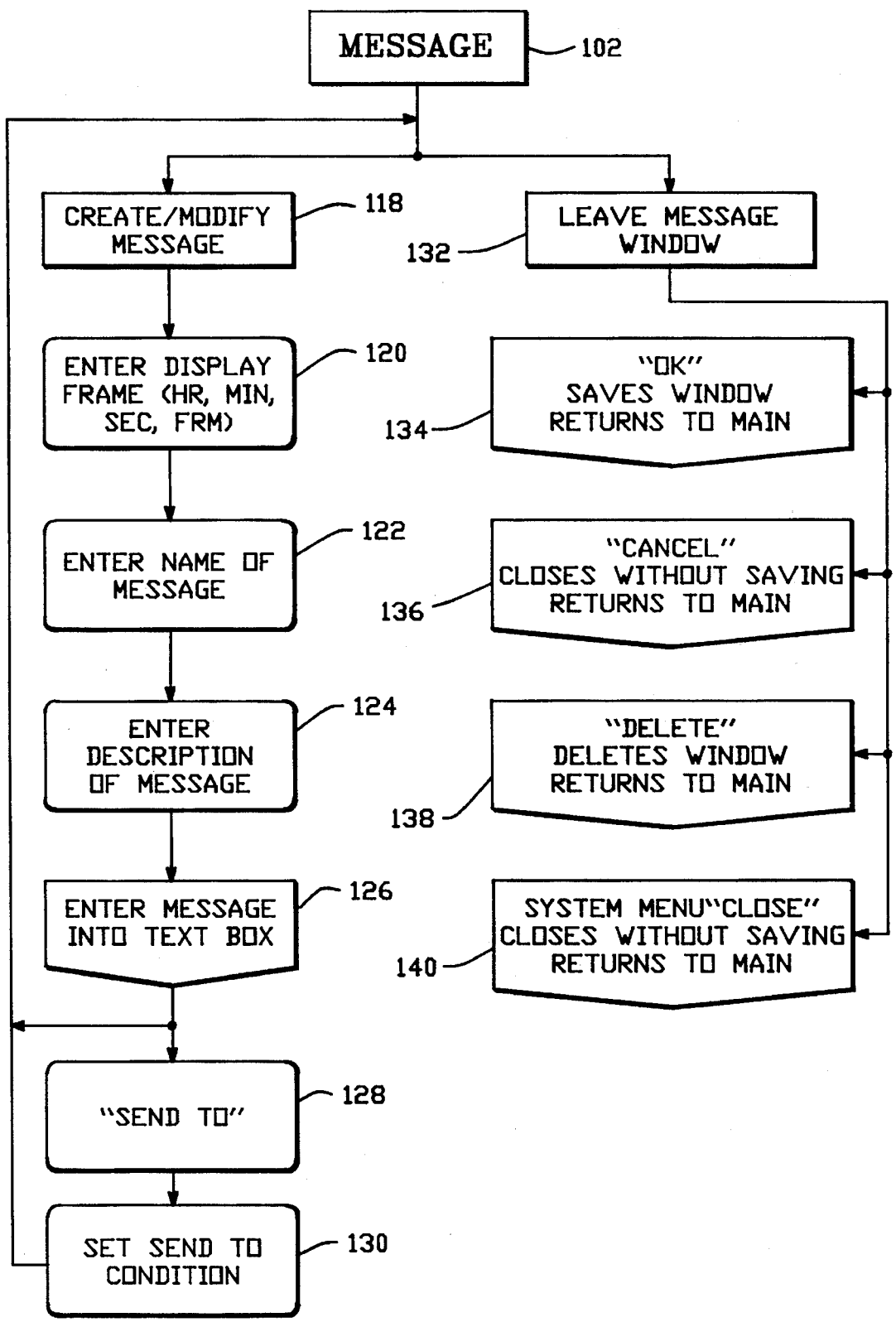
FIG. 3C is a flow chart and block diagram explaining the Message Window of the Authoring System.

Script menu 66, described in more detail in FIG. 3B, is chosen when a script writer is creating scripts. The script writer can create a message 102, a question 104, a table 106, a score registration 108, a mini-game 110 or a branching instruction 116. If the script writer chooses to create a message 102, then the script writer is presented with the message window 102 (FIG. 3C) which gives the option of creating/modifying a message 118 or leaving the message window 132. If the script writer chooses to create/modify a message 118, the script writer can enter the frame number 120 for the scripit, the name of the message 122, and a description of the message 124. The script writer would then enter a message into text box 126, which would be a window having a blank line. The script writer has the "Send To" option 128 with condition 130 to restrict which viewers will receive the message. For example, the script writer can choose to send the script to all viewers who have scored above 700 points or all viewers based on demographic data. If the script writer does not choose any restrictions then every viewer playing along with the script would receive the message.

The script writer has four options when leaving the message window 132. The OK icon 134 saves all of the information that has been entered by the script writer. Alternatively, the script writer can use the cancel icon 136 which returns to the main menu without saving any of the information input by the script writer, or the script writer can delete 138 all information in the message window and return to the main menu 60. The script writer can also choose to select system menu close icon 140, which causes the script writer to exit the authoring system software.

Figure 3D:
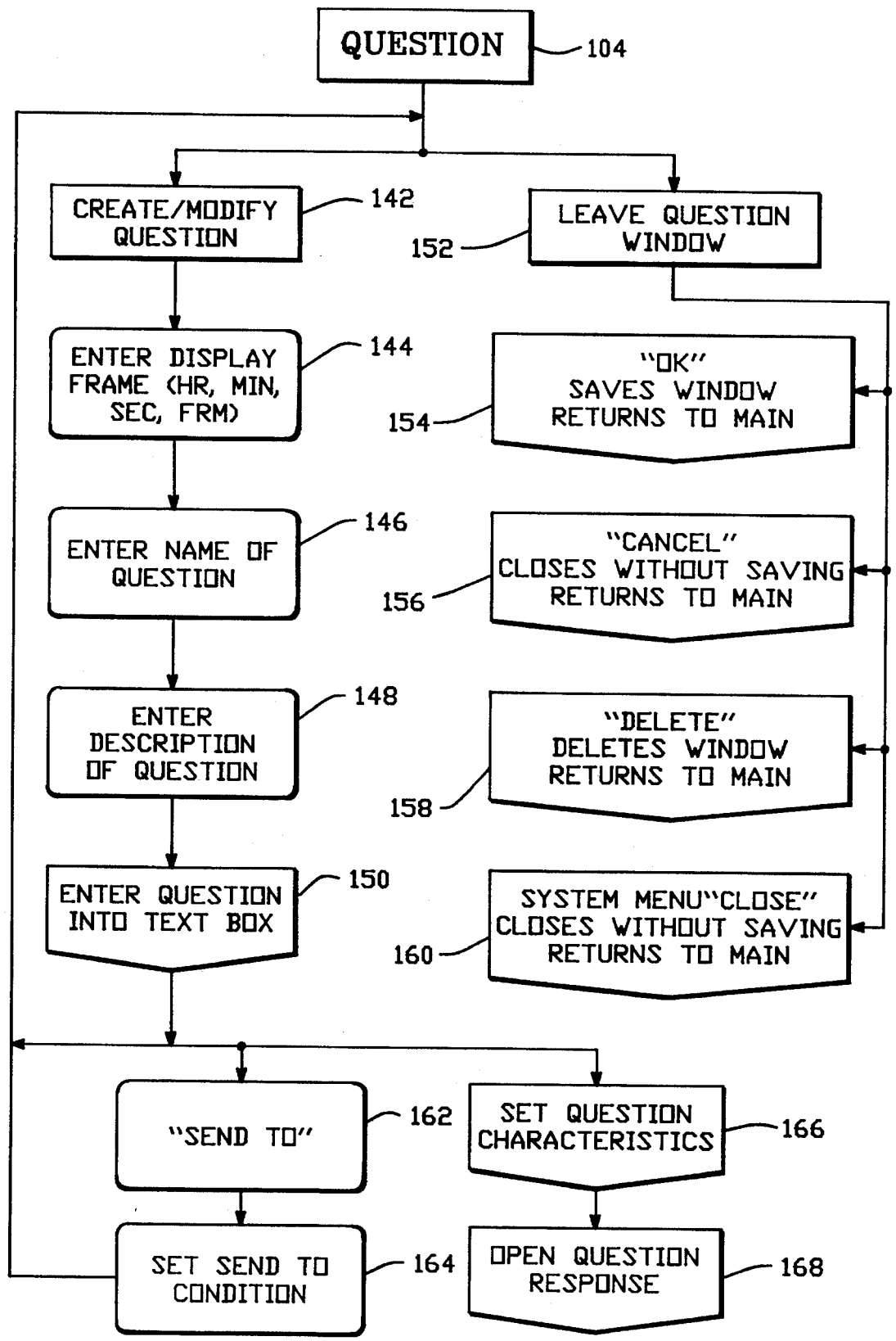
FIG. 3D is a flow chart and block diagram explaining the Question Window of the Authoring System.

Question window 104 is used when a script writer in the script menu 66 chooses to create a question (FIG. 3D). The script writer has an option to create or modify a question 142 or leave the question window 152. If the script writer chooses to create or modify a question 142, the script writer enters the frame (or time code) information 144, the name of the question 146 and a description of the question 148. The script writer then enters a question into the text box 150. The script writer can choose to restrict the viewers who receive the information 162 and 164 (see discussion with regard to icons 128 and 130 in FIG. 3C). The script writer can leave the question window 152 by selecting the OK icon 154, cancel icon 156, delete icon 158 or system menu close icon 160 (as described with respect to FIG. 3C).

Before leaving the question window, the script writer has the option to set a question characteristic 166 and/or open question response 168.

Setting the question characteristics 166 includes setting the defaults; for example, whether the response typed in by the viewer on handheld 32 should be echoed back, whether any tone should accompany prompts and restricting the amount of time a viewer has to enter a response.

Figure 3E:
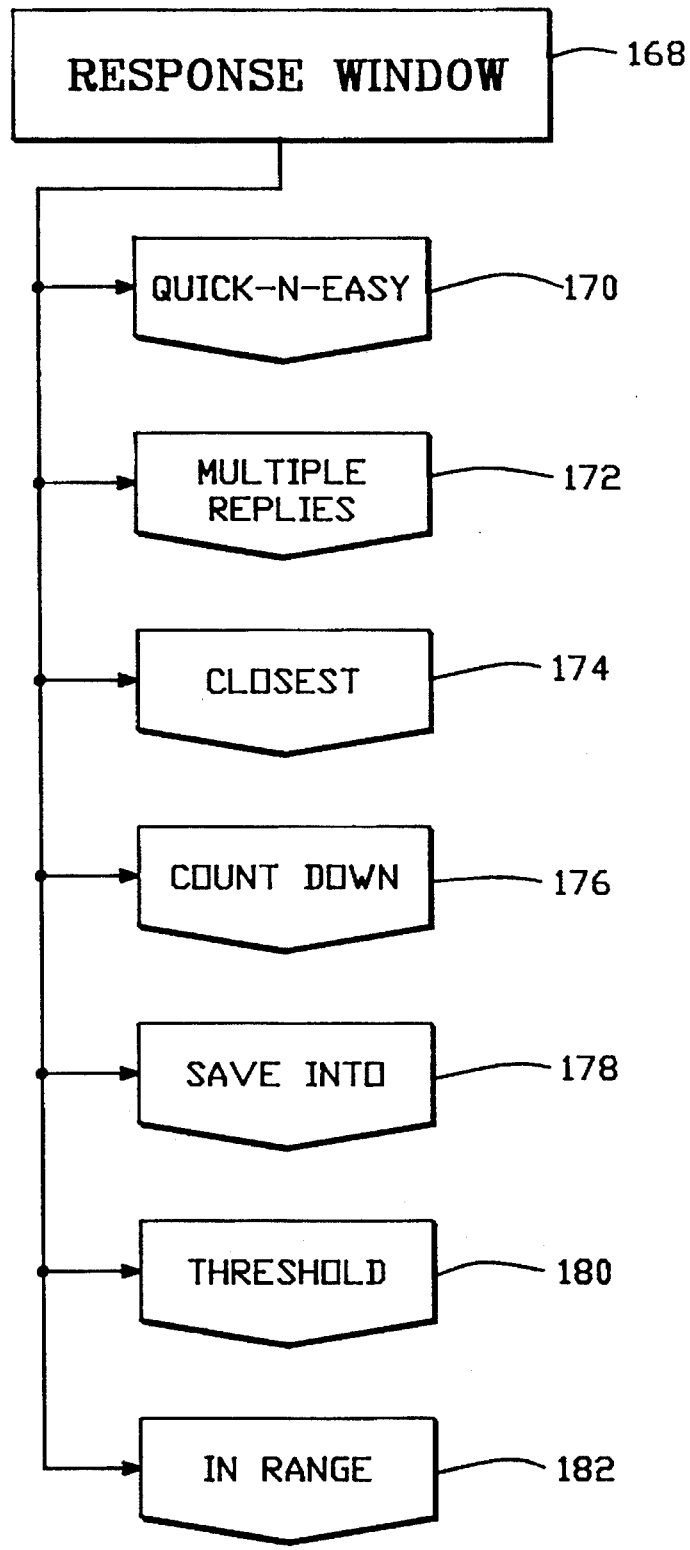
FIG. 3E is a flow chart and block diagram explaining the Response Window of the Authoring System.

When the script writer chooses the Open Question Response window 168, the script writer is given several alternatives for the response type (FIG. 3E). If the script writer chooses Quick and Easy 170, the script writer must enter the correct answer, the points awarded for the correct answer, the reply displayed on handheld 32 if the viewer selects the correct answer and the reply displayed if the viewer selects the wrong answer.

If the script writer chooses Multiple Replies 172, the script writer enters a set of correct answers, the number of points awarded for each correct answer and messages for each of the correct answers.

If the script writer chooses Closest 174, the script writer enters the correct answer, defines the range of answers in which viewers will score points and determines the maximum amount of points to be awarded. The script writer must also input the text to be displayed by handheld 32 when the viewer inputs an answer in the defined range. Handheld 32 uses a predetermined formula for allocating points for answers inside the defined range. For example, if the correct answer is 50, the acceptable range of answers is 30 to 70, and a viewer guesses 40, then the viewer would be off by 50% and would only receive 50% of the maximum allowed points. Alternatively, scoring could be allocated using a bell curve.

$$\frac{\text{correct answer} - \text{viewer's answer}}{\text{correct answer} - \text{range limit}} \times 100\% = \frac{50-40}{50-30} \times 100\%$$

If the script writer selects Count Down 176, the script writer enters the correct answer, the maximum number of points possible, the answer time interval and the number of points to decrement per time interval. After the viewer is presented with a question, the clock in handheld 32 begins to run. At every time interval, it subtracts the number of points designated by the script writer from the maximum number of points. For example, if the maximum number of points was 100, the time interval is 5 seconds, the points to subtract per interval is 10 points, and the viewer entered the correct answer in 32 seconds; then the viewer would be awarded 40 points.

If the script writer chooses Save Into 178, the script writer chooses the register (any one of SAVE1–SAVE7, to be discussed below) which will store the viewer's response.

If the script writer chooses Threshold 180, the script writer enters the threshold goal which is the number of correct answers that a viewer must achieve, and the point value for reaching the threshold goal. Additionally, the script writer can enter text to be displayed by handheld 32 informing the viewer whether the threshold was reached.

If the script writer chooses In Range 182, the script writer enters the low limit of the range and the high limit of the range of acceptable answers. Additionally, the script writer enters the point value and a message for answering within the range of acceptable answers.

Looking back at FIG. 3B, another option from the script menu is a table 106. A table is text information, like a message. However, a message is displayed immediately and a table is stored in the memory of handheld 32. A viewer must use a key to get the information in a table. A key is a password learned by answering a correct question, watching a television program, reading a newspaper, or any other incentive an affiliate or advertiser might have. A viewer would enter the password into handheld 32 which would trigger the display of the message from the table. The table is likely to include some type of valuable information.

The script writer could chose score registration 108, which allows the script writer to send a message to the screen of handheld 32 indicating to the viewer that his or her score has met certain thresholds and that they should call operations 34 to register their score for a prize. The viewer's score may also be stored for long range storage in the memory of handheld 32.

Script menu 66 also allows for branching 116, which is similar to branching in other types of computer programs.

From script menu 66 the script writer can select minigames 110, which allows the script writer to create questions, answers and messages for use in a mini-game (described above).

When designing any of the scripts described above, the script writer has the option of entering in the frame number or other timing information to be used for transmitting the corresponding transaction to handheld 32.

Once an interactive program is compiled, the object code created must be communicated to data insertion control 14. The means for transmitting object code to data insertion control 14 includes hand carrying by disk, using a computer network with appropriate software, communication over telephone lines, a wire, or authoring system 12 and data insertion control 14 can share the same hardware.

III. Data Insertion System

In the preferred embodiment, data insertion control 14 is a windows application at least partially implemented using a high level programming language; for example, C. The windows application acts as control software for Insertion Card 20. The Insertion Card interface, however, is defined in terms of low level messages along with a framing structure and communications protocol. Thus, device driver 18 is needed to translate between these two environments.

Device driver 18 requirements are defined in terms of required functions and general operations. There are four required functions that device driver 18 must perform. First, device driver 18 functions need to be made available to windows applications. This is accomplished by creating a library of linkable C functions. Second, interrupt handling routines must be installed to handle the transmit and receive interrupts associated with DMA transfers to and from Insertion Card 20. Third, DMA transfer to and from Insertion Card 20 must be initialized. Fourth, downloadable firmware must be sent to Insertion Card 20.

Figure 4:
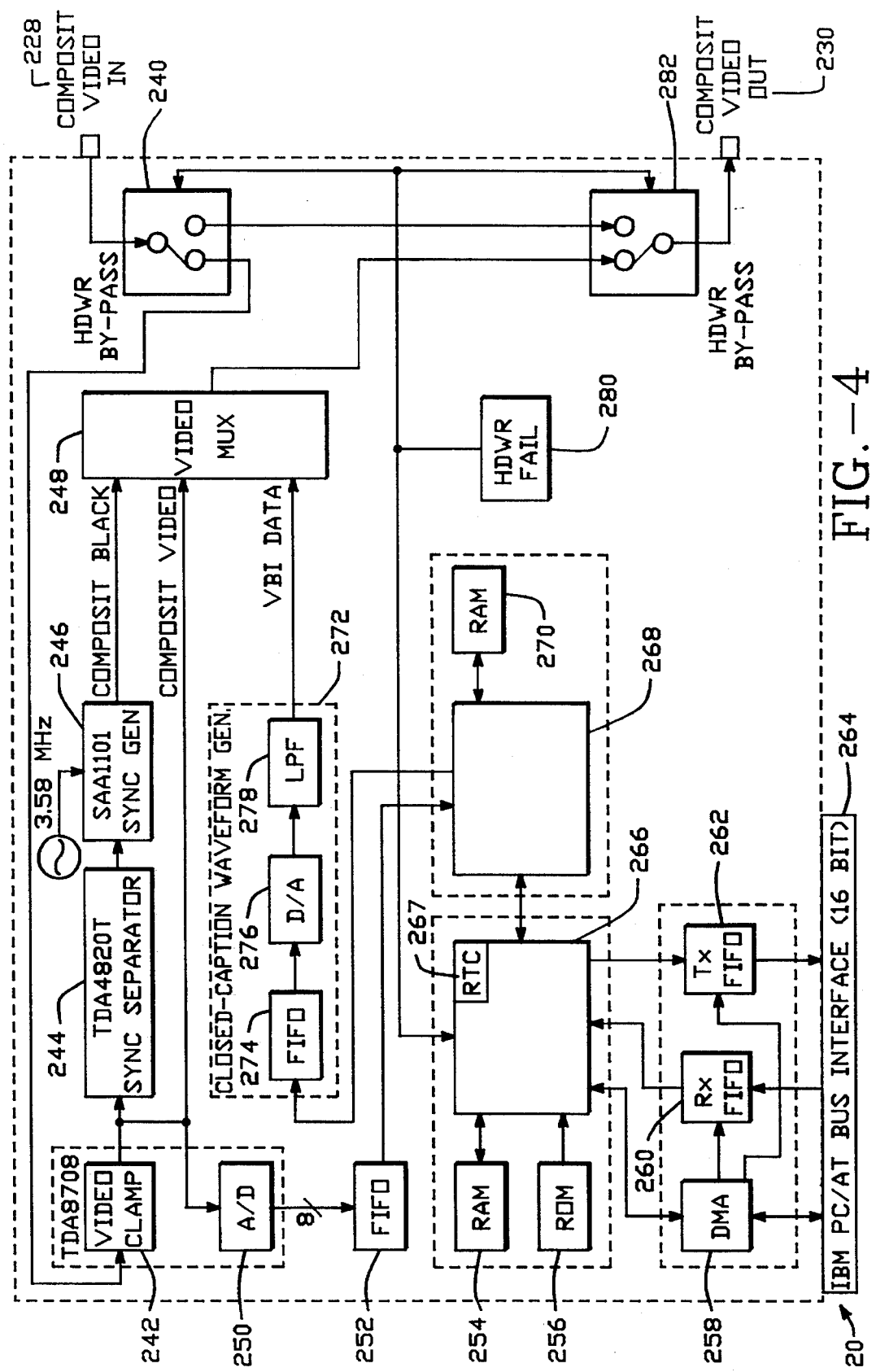
FIG. 4 is a block diagram of the VBI Card of the Present Invention.

FIG. 4 shows the hardware architecture for Insertion Card 20, which uses standard VBI insertion technology known in the art. It consists of a video processing circuitry, a video signal processor, a control processor, hardware failure detection circuitry and an IBM PC AT bus interface.

Composite Video In 228 is first sent to hardware bypass 240. Should the hardware on Insertion Card 20 fail, Insertion Card 20 can be bypassed by properly switching hardware bypass 240 and 282, sending Composite Video In 228 directly to hardware bypass 282 and exiting as Composite Video Out 230. Normally, however, bypass 240 sends signal 228 to video clamp 242.

Video processing circuitry is provided on Insertion Card 20 to slice data from the VBI and to insert data into the VBI. The data inserted into the VBI is the transaction data. Insertion Card 20 slices data from the VBI in order to monitor and validate data already existing in the VBI. For example, if a television program has been recorded on a videotape or other recording medium and there is data in the VBI, Insertion Card 20 can slice the data (e.g. read the data) in order to determine if the data is valid interactive data. If so, the Insertion Card could add a new valid stamp and/or time stamp (discussed below) to the date in order to ensure proper handling by handheld 32.

Composite Video In 228 is accepted at the video input and referenced to a known DC signal at video clamp 242. The output of video clamp 242 is sent to three places. The first place, is the data slicing path where the output of video clamp 242 is sent to an Analog to Digital Converter 250 and stored in FIFO 252. Video processor 268 then removes the VBI data from FIFO 252 in a non-real-time manner.

The output of video clamp 242 is also presented to a sync separator 244 and sync generator 246 which together extract horizontal and vertical sync information used by video processor 268 for timing purposes. A synchronized composite black video can be created for testing purposes.

The output of video clamp 242 is also AC coupled and sent to video mux 248. This path is used to allow the television program portion of the signal to pass through Insertion Card 20.

Data is inserted into the VBI using both video processor 268 and control processor 266. Two processors are used on Insertion Card 20 to increase performance. Video processor 268 is used to process the data that is inserted into the VBI. Control processor 266 performs all other functions, including sending commands to video processor 268. Thus, RAM 270 can hold slightly more than one transaction of data, while RAM 254 can hold many transactions plus other data. In the preferred embodiment, the control processor 266 is a Motorola 68HC16 and the video processor is a Texas Instrument TMS 32052. Additionally, control processor 266 has ROM 256 for storing control software.

In communication with control processor 266 is a DMA controller 258 which sends the proper handshaking and control signals to the IBM PC/AT bus interface 264. Data is sent from Insertion Card 20 on the transmit DMA channel from FIFO 262. Data is received from the receive DMA channel into FIFO 260. Via the DMA channel, insertion control 14 controls Insertion Card 20. Insertion control 14 determines when to send data, and what data to send. Insertion control 14 creates all the header information and data formatting (described below). Furthermore, insertion control 14 is responsible for the manipulating of data; for example, encrypting, interleaving, error codes and other data manipulation.

When data insertion control 14 commands Insertion Card 20 to send data on the VBI, the data is received in FIFO 260 and sent to control processor 266 which can add a valid stamp, and a time stamp based on Real Time Clock (RTC) 267. The data is then sent to video processor 268 where it is prepared for insertion into the VBI. Video processor 268 uses the sync information from sync separator 244 and sync generator 246 as timing information. The VBI data is then placed in FIFO 274. From FIFO 274 the data is digitized at A/D converter 276 and sent through low pass filter 278, and on to video mux 248.

The VBI is only a small portion of the video signal (see discussion below about VBI). Therefore, when data is being inserted into the VBI the video mux is selecting Composite Video for a majority of the time. During the portions of the Composite Video that constitute the VBI, video mux 248 selects VBI data, which is the output of low pass filter 278.

The control processor 266 is responsible for supporting downloadable code, video signal processor setup, all VBI commands and other general functions. The control processor 266 passes all received messages and formats all outgoing messages. It is also responsible for transaction framing/synchronization, FEC coding, time stamping and validation.

IV. Data Transmission

Figure 5:
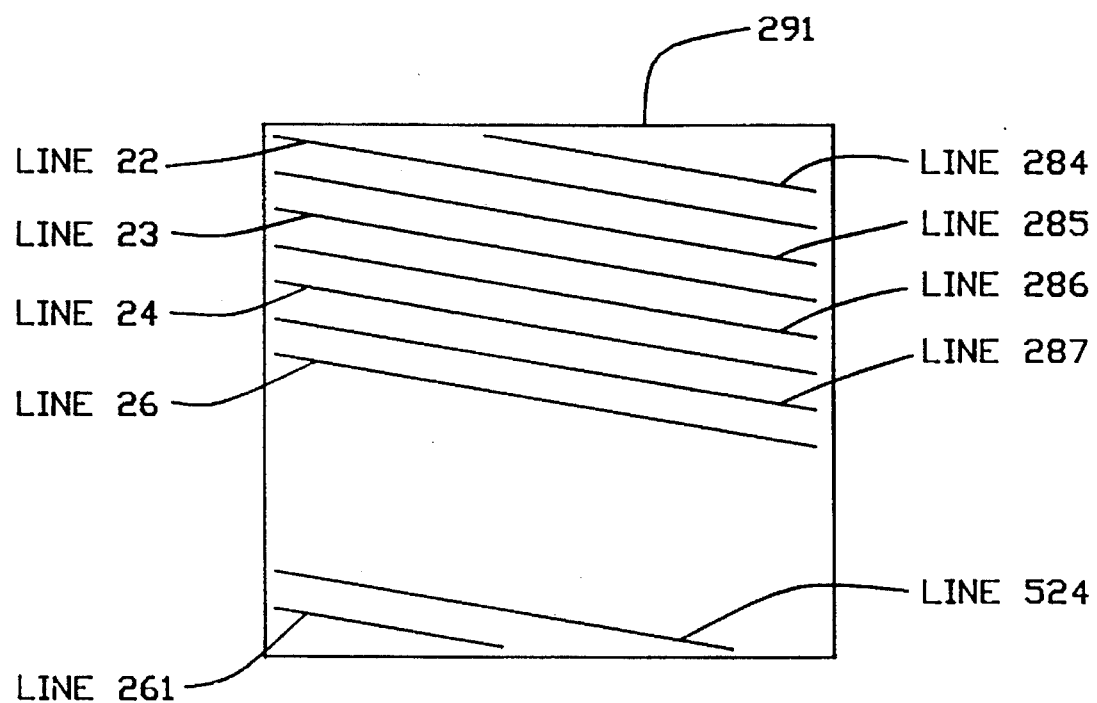
FIG. 5 shows the travel of the cathode ray, and the lines of data on a standard television.

Data inserted by Insertion Card 20 must be in a format that conforms to existing television signals. Picture scan for a cathode ray tube television display is generally from left to right and top to bottom consisting of 525 horizontal lines per frame and 30 frames per second. Each frame is divided into two alternating fields: odd field and even field. Referring to FIG. 5, beginning at the upper left-hand corner of television screen 291 is line 22, followed by line 23, line 24, line 26, ... line 261. This is the odd field. After line 261, the cathode ray beam then travels back to the top of the picture. The period of time while the beam is traveling back to the top of the picture is called the vertical blanking interval (or VBI). This is not an instantaneous bottom to top jump but actually requires the same length of time as 21 lines. These lines (the VBI) are numbered 262 to 282. The even field then begins with the second half of line 284, then line 285 . . . line 524. After line 524, the beam then travels back to the top of the picture during the vertical blanking interval. This vertical blanking interval is represented by lines 1–21.

Figure 6:
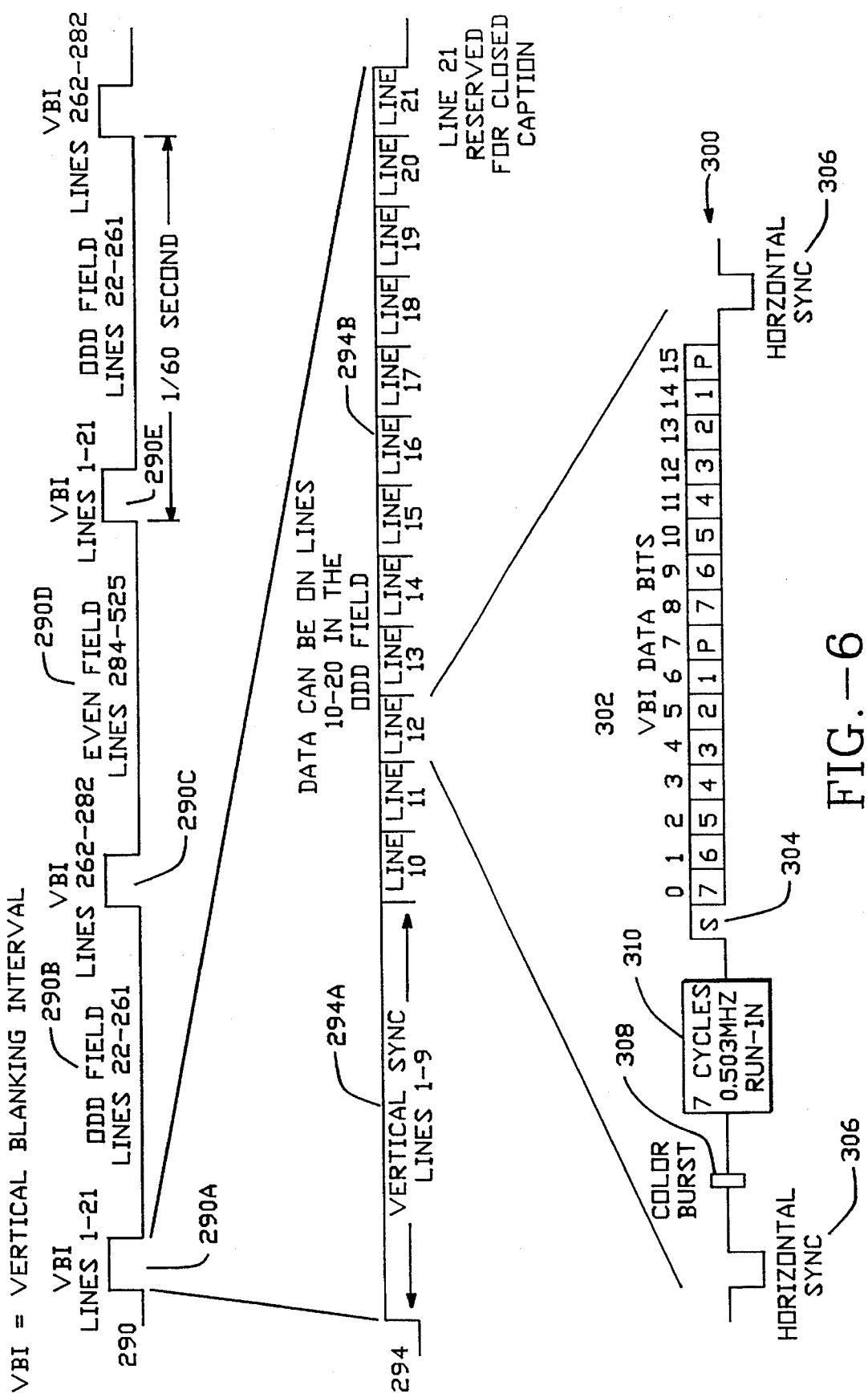
FIG. 6 shows the data structure on the Vertical Blanking Interval.

FIG. 6 shows a time line 290 for the different lines of information in the video signal. The odd field vertical blanking interval is represented by 290A which includes lines 1–21. Following VBI 290A is odd field 290B consisting of lines 22 through 261. After odd field 290B, the beam travels back to the top of screen 291, during which is the even VBI 290C, lines 262 to 282. After even VBI 290C, the even field of data occurs 290D which includes lines 284 to 525. Each field of data (e.g. odd or even) and its accompanying VBI is 1/60th of a second.

Odd vertical blanking interval 290A is broken out in FIG. 6 on line 294. The VBI includes vertical sync 294A which occupies lines 1–9, followed by the data lines 294B which occupy lines 10–21. The vertical sync 294A indicates the beginning of a vertical field, thus, signaling the need for the cathode ray beam to return scan to the upper left hand corner of the screen. Line 12 is broken out in more detail and shown as 300.

Figure 7:
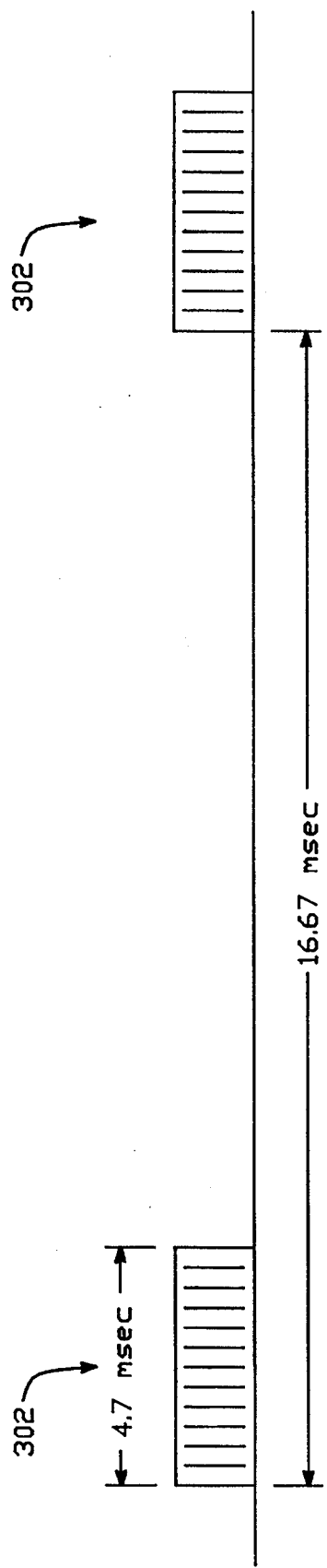
FIG. 7 depicts the data spacing for the data of FIG. 6.

Any conventional data format for a line of data is acceptable with the understanding that the data may be inserted on blank lines within the vertical blanking interval. One format for data transmitted within the VBI that is both well documented and considered to be reliable is the format chosen for closed captioning. This format transmits a horizontal synchronization pulse 306, a color burst signal 308, a clock run-in signal 310, and a burst of data 302 which is preceded by a start bit 304. The data 302 includes fourteen bits of data and two parity bits. The horizonal sync pulse 306 is included in every line of data to signal the beginning of a line of data or, in other words, signaling a retrace by one line. Color burst 308 provides information needed to decode color. Each burst of data 302 is repeated at a rate of 16.67 milliseconds (as seen in FIG. 7). Data may be inserted on any of the lines of the VBI between line 10 and line 21.

Figure 8:
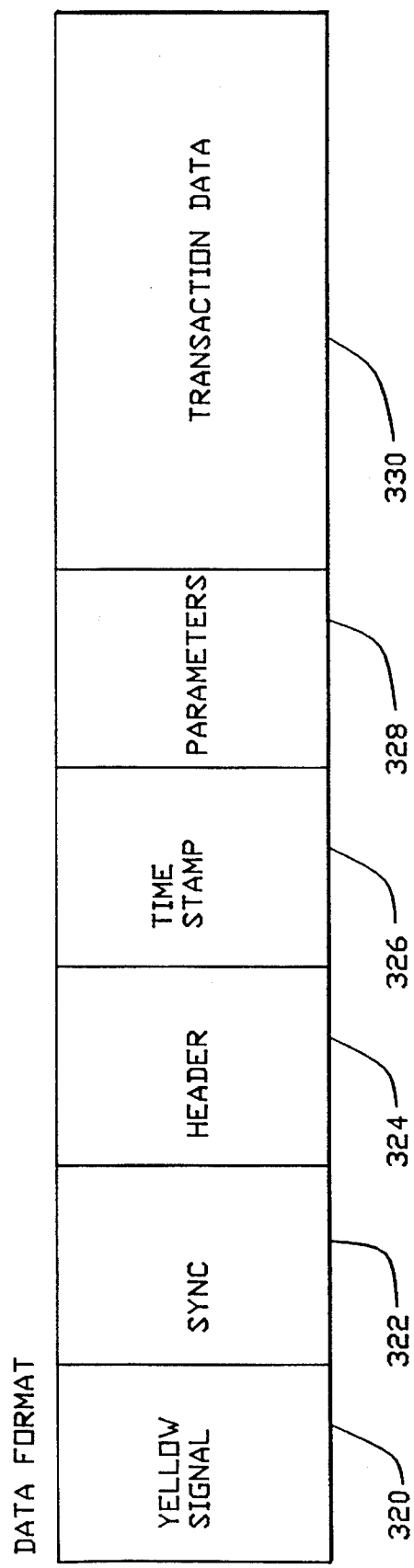
FIG. 8 shows the format of the interactive data transmitted on the vertical blanking interval.

FIG. 8 shows the structure of the data that is sent on the VBI lines. Data insertion control 14 assembles the data into this format before inserting the data into the VBI. The data consists of a yellow signal 320, a synchronization pattern 322, header information 324, time stamp 326, transaction parameters 328, and transaction data 330.

The yellow signal 320 is used to flag the beginning of a framed transaction and is used by Insertion Card 20 to avoid transaction collisions. It currently consists of two words of all 1's.

The synchronization pattern 322 is used to synchronize the start of a transaction. The synchronization pattern 322 is currently defined as: 11111001, 10101110, 00000110, 01010001, 10001010, 01100000, 01110101, 10011111.

Header 324 consists of a source address, destination address, affiliate number, VBI line number and transaction size. The source address is the address of the device that is generating the original data. The destination address is the address of the type of device that is receiving the data (e.g. handheld 32).

Time stamp 326 is inserted into the interactive data by Insertion Card 20, at the direction of data insertion control 14, at the time of transmission. The time stamp, which identifies the time that the data was transmitted by the Insertion Card 20, is used to protect against cheating during an interactive program where prizes may be awarded.

Parameters 328 include, but are not limited to, segment number, transaction number, game skill level, a validation stamp, time stamp enable, group number, unit number, mailbox number and other parameters associated with presenting transactions. Time stamp enable toggles the time stamp security system on and off. The validation stamp is used to distinguish valid interactive data from other data.

In order to provide efficient and reliable transmission on the VBI, interactive data can be muxed, FEC coded, interleaved, combined, encrypted and error corrected. The data muxing function packs input items of various bit lengths into an integer number of bytes. Zero fill is used and items are combined most significant bit first. For example, if the source address is Aaaaaaaaaa, the mailbox number is Bbbbbbbbbb and the destination address is Cccc; then byte 1 could be Aaaaaaaa, byte 2 could be aaBbbbbb, and byte 3 could be bbbbCccc.

The FEC coding function accepts an integer number of bytes and outputs an integer number of FEC codewords based on the FEC coding scheme being used. The preferred embodiment uses a rate of three-fourths code with a code word length of 32 bits.

The interleaving function accepts an integer number of FEC code words and outputs an integer number of interleaved blocks. An interleaved block consists of 8 code words where 8 is the interleave factor. Zero fill is used if less than 8 code words are interleaved. For example, the following 8 code words could be interleaved as follows:

code word 1: AaaaaaaaBbbbbbbbCcccccccPppppppp code word 2: DddddddEeeeeeeeFfffffffPppppppp code word 3: GggggggggHhhhhhhhIiiiiiiiiPppppppp code word 4: JjjjjjjjKkkkkkkkLllllllllPppppppp code word 5: MmmmmmmmNnnnnnnnOoooooooPppppppp code word 6: QqqqqqqqRrrrrrrrSssssssssPppppppp code word 7: TttttttttUuuuuuuuVvvvvvvvPppppppp code word 8: WwwwwwwwXxxxxxxxYyyyyyyyPppppppp.

After interleaving:

code word 1: ADGJMQTWadgjmqtwadgjmqwadgjmqtw code word 2: adgjmqtwadgjmqtwadgjmqtwadgjmqtw code word 3: BEHKNRUXbehknruxbehknruxbehknrux code word 4: behknruxbehknruxbehknruxbehknrux code word 5: CFILOSVYcfilosvycfilosvycfilosvy code word 6: cfilosvycfilosvycfilosvycfilosvy code word 7: PPPPPPPPpppppppppppppppppppppppp code word 8: pppppppppppppppppppppppppppppppp The data combining function combines data by appending one input to another. The encryption function accepts an integer number of bytes and outputs an integer number of encrypted blocks. The encrypted block is defined by the specific encryption algorithm being used. Currently, an encryption block is 8 bytes. Zero fill is used.

The CRC generation function accepts an integer number of bytes and calculates a 16-bit check word. A CRC algorithm is used to implement the following polynomial: $x^{16}+x^{12}+x^5+1$. Furthermore, Insertion Card 20 includes a select module (not shown) to determine on which VBI line to send the data.

V. Settop device

Data is recovered from the VBI, by settop device 28, at a sample rate of 500,000 bits per second. However, this rate occurs for a short burst during the vertical blanking interval. A specific line of data only occurs every 16.7 milliseconds, thus, the data stream consists of 14 bits clocked at a high rate followed by 16.7 milliseconds of no data. As shown in FIG. 7, the 14 bits are transmitted within 4.7 milliseconds. The purpose of settop device 28 is to recover this data transmitted during the VBI at a high data rate and, using infrared transmission, send that information to handheld 32 at a much slower data rate of 4,900 bits per second. This task can be accomplished generally using a buffer or memory device with different clock rates for input and output.

Figure 9:
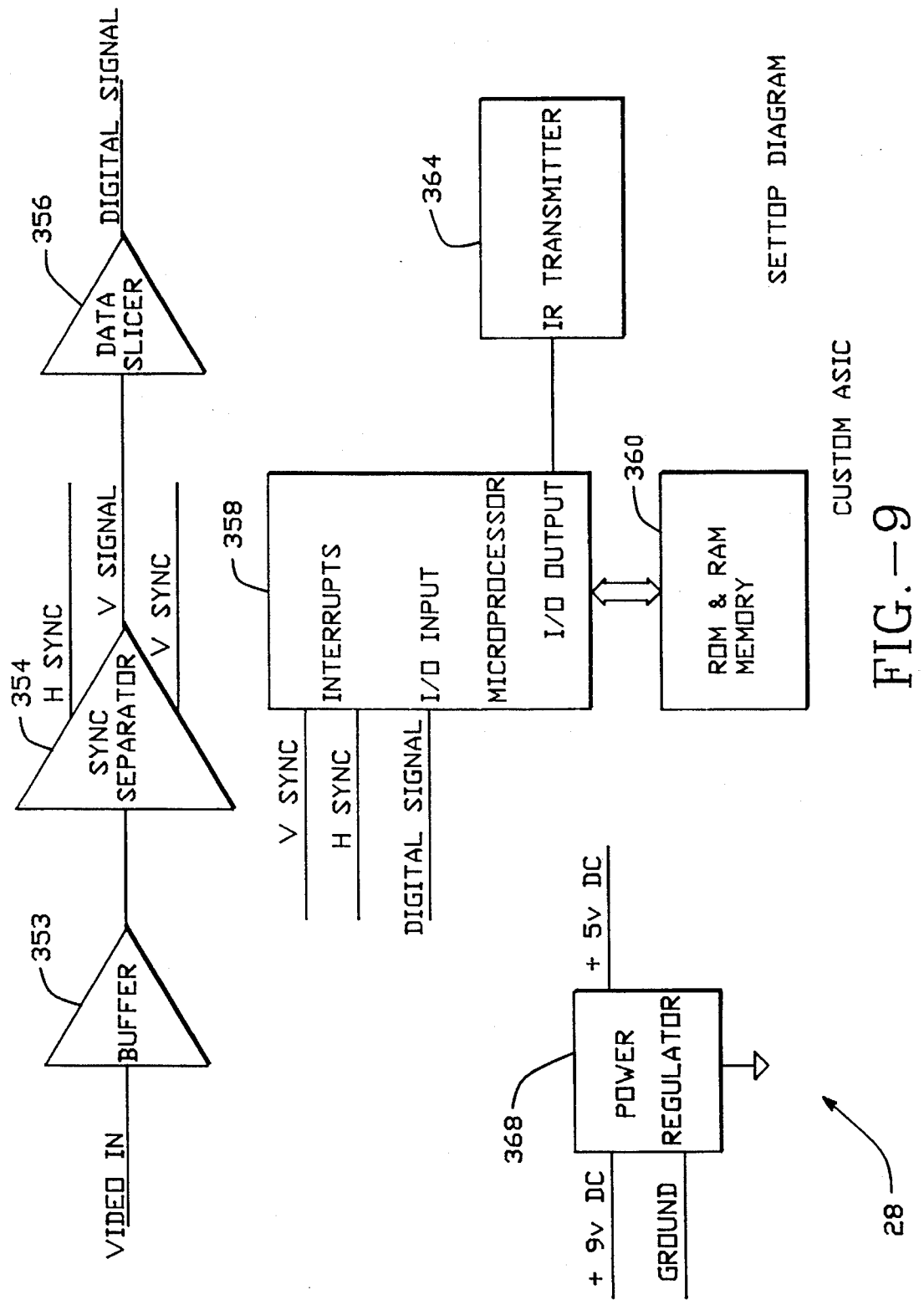
FIG. 9 is a block diagram of the settop device.

FIG. 9 depicts a more detailed representation of settop device 28, which is similar to a conventional decoder for decoding VBI information used, for example, for closed caption applications. Settop device 28 includes a buffer 353 for receiving the video signal and a sync separator 354. This sync separator 354 extracts the synchronizing information (H Sync and V Sync: which are the horizontal sync and vertical sync discussed above) from the video signal and sends them to microprocessor 358. The stripped video signal which is the output of sync separator 354, labeled V-signal, is sent to data slicer 356. Data slicer 356 digitizes the signal and sends the digitized signal to microprocessor 358. Connected to microprocessor 358 is ROM and RAM memory unit 360, which is used to store control code and data.

Microprocessor 358 is connected to a clock (not shown). The clock includes a divider circuit so that two clock signals are available. The two clock signals have different frequencies which enable the settop device 28 to read data in at one speed and send data out at another speed. Microprocessor 358 is powered by power regulator 368. The output of microprocessor 358 goes to infrared transmitter 364.

In operation, data is received as part of a video signal, sync information is stripped from the video signal and the transaction information is removed from the video signal, by microprocessor 358, using the sync information. Additionally, microprocessor 358 deinterleaves and decodes the data and stores the data in RAM 360. RAM 360 could be any memory device known in the art. The data is then clocked out of RAM 360 at a data rate of 4,900 bits per second where it is sent to IR transmitter 364 and transmitted to handheld 32.

VI. Handheld

Figure 10:
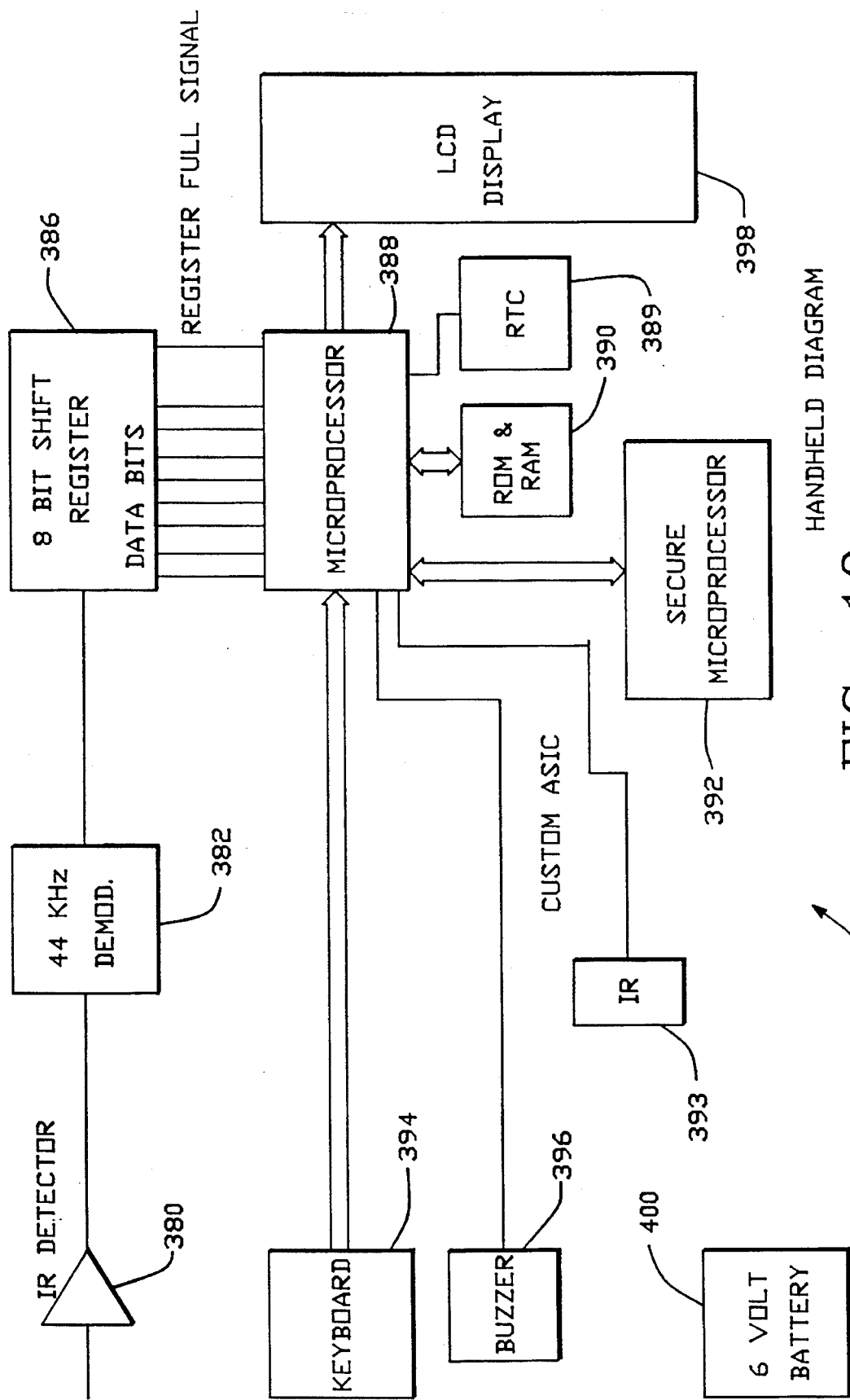
FIG. 10 is a block diagram of the handheld.

Handheld 32, shown in FIG. 10, provides the means for participating in the interactive program. Handheld 32 receives a data stream from settop device 28 and implements/presents the interactive program. The data stream received by handheld 32 includes commands and event specific data.

The data stream is received first by an IR detector 380 which senses the infrared signal from settop device 28. The signal received by IR detector 380 is sent to a 44 KHz demodulator 382 which removes the infrared carrier frequency, leaving a serial data stream. The serial data stream is sent to an 8-bit shift register 386 which converts the serial data stream to parallel data for microprocessor 388. The data sent to microprocessor 388 is stored in RAM 390 until a full transaction is received. At that time, microprocessor 388, which communicates with real time clock (RTC) 389, builds a sequence of commands and data which are used to present the transaction.

ROM and RAM 390 of microprocessor 388 contain a control program and a command interpreter for the commands sent on the VBI. The RAM portion stores the data and commands transmitted over the IR link. The preferred microprocessor 388 is an embedded processor, on an ASIC, similar to a Rockwell 65C02. In communication with microprocessor 388 is a secure microprocessor 392. The preferred secure microprocessor is Motorola 68HC05SC27. Secured microprocessor 392 allows data to be stored in a tamper proof manner, unaccessible to unauthorized personnel. Handheld 32 further includes a keyboard 394. A buzzer 396 is included to alert the viewer, for example, when the viewer's answer is correct or that handheld 32 is awaiting a response. Handheld 32 further includes an LCD display 398, which is a 4-line by 16-character display. LCD display 398, in the preferred embodiment, shall conform to the features of the Sharp LM24255 (pre-programmed character generator ROM and 8-character generator RAM locations). To extend battery life, the LCD power should be controlled by an I/O bit from the microprocessor 388. Also connected to microprocessor 388 is Infrared Transmitter 393 which communicates with dialer 33.

Handheld 32 is powered by 6-volt battery 400 which is preferably 4 AA cells. There can be an additional lithium cell (not shown) that powers the ROM and RAM 390, and secure microprocessor 392 when loss of main power is detected since these must remain powered at all times. Main power is lost when the 6-volt battery 400 is drained below minimum working voltage or removed entirely.

FIG. 11 shows an example of handheld 32. Case 420 is made from molded plastic of a strength and texture suitable for use by viewers in a household environment. Keypad 394 should be molded rubber with carbon contacts that make switch connections against a switch pattern on a printed circuit board. The buttons on keypad 394 could be marked with numbers and/or words. The words could include, but are not limited to "yes", "no", "true", "false", "poor", "fair", "average", "good", "excellent", "info" and "dialer". The "info" button is used to access tables. The "dialer" button is used to communicate with dialer 33. On the front 422 of handheld 32, is a window of red tinted plastic that filters visible light and receives infrared data. The IR receive circuitry will be mounted on a PC board behind this windows.

As discussed above, handheld 32 receives all remote data from settop device 28 via an infrared data link. The performance of this link should have a bit-error rate of less than 1-error for every 100,000 bits transmitted (random bit errors) when in the configuration shown in FIG. 12. In this configuration, handheld 32 should preferably be within 7.6 meters (25 feet) from the transmitter of settop device 28 and anywhere within plus or minus 60° of the central line of the transmitter.

The features of an interactive program are implemented in part in software resident in handheld 32. This software performs two functions. The first function is to build a transaction from high level commands transmitted via the IR link. The second function is the execution/presentation of the transaction. During the time that a participant is responding to a given transaction, the next transaction is being received and made ready for the participant to process. Using this approach, the amount of information transmitted prior to a viewer being able to use handheld 32 is essentially transparent to the viewer compared to other interactive devices.

Timed responses where the participant must react within a specific time interval can be controlled by either microprocessor 388 in conjunction with real time clock 389, or via a new transaction being sent and activated before the participant enters responses to the prior question.

The interactive system can use encryption algorithms and keys as is known in the trade. Handheld 32 would thus store, for example, three keys at least one of which could be reprogrammed by a signal sent on the VBI.

VII. Handheld Memory

FIG. 13 shows the memory map for microprocessor 388 and secure microprocessor 392. With regard to microprocessor 388, memory location 000-001F (450) is used to map the I/O devices, e.g. keyboard, display, buzzer. Memory locations 0020-7FFF (452) is used as RAM to store programmer tables and other data. Locations D800-FFFF (454) is used as ROM.

With respect to the secured microprocessor, memory location 000-001F (456) is used to map the I/0 devices. Locations 0020-00FF (458) is RAM. Locations 0530-1 OFF (460) is an EEPROM used to store programmer tables. Locations 4000-7FFFF (462) is ROM used to store control information.

The interactive system stores data in handheld 32 in registers within programmer tables. Every affiliate has one or more assigned programmer tables so that handheld 32 knows where to store the information specific to that affiliate's interactive program. Additionally, handheld 32 has two universal registers used by all affiliates. One universal register is the Input Register, for temporarily storing viewer's answers to questions. For example, in a multiple choice question, if the viewer enters "4", the Input Register is loaded with a "4". The input register is automatically updated after each question. There is only one input register for each handheld 32. The second universal register is the Points Register, which stores the points earned for entering the correct response to a single question. For example, in a multiple choice question, the correct answer of "4" may earn 25 points. Therefore the value in Points Register would be 25.

FIG. 14 is a block diagram of a programmer table. There are fifteen registers per programmer table. Of the fifteen registers, eight have specific functions and seven are general. The eight specific registers are the Mailbox Register 470, Group Register 474, Unit Register 478, Score Register 482, Cume Register 484, Bank Register 500, Segment/Transaction Register 502 and Status Register 504.

The Mailbox Register 470 stores the mailbox number. Affiliates can purchase (or be assigned) the exclusive rights to one or more programmer tables. The Group Register 474 stores the group number for the current transaction. The Unit Register 478 stores the unit number for the current transaction. The Segment/Transaction Register 502 stores the segment and transaction number for the current transaction. Status Register 504 holds the status for the current transaction, which includes the cheater bit. Initially, the cheater bit would be reset to zero. If, during the course of an interactive program, the viewer attempts to cheat, the cheater bit would be set to 1. Once the cheater bit is set to 1, the Cume Register 484 is frozen.

Score Register 482 stores the score for one program. For example, if the score for one game of a series is 225 points, the Score Register would have 225. Score Register 482 is automatically updated by the value in the Points Register after a correct answer is scored. Cume Register 484 stores cumulative scores for a series of programs as identified by the group number. The series may be one or more episodes. Using the example described above with respect to the score register, if the second game score is 275, the cume register could be 500, being the addition of game one (225) and game two (275) of the series. The cume register is automatically updated by the value in the Points Register 480 after every correct answer.

Bank Register 500 stores the accumulated points earned within a mini-game, without updating the Score or Cume Registers. At the end of a mini-game, the script writer has the programming option to add Bank Register 500 to Score Register 483 and Cume Register 484, or to save the contents of Bank Register 500 for later use. For example, the script writer can use the value within Bank Register 500 for another mini-game without adding it to the viewer's Score and Cume Registers. Mailbox Register 470, Affiliate Register 472, Group Register 474, Unit Register 478, Points Register 480, Score Register 482, Cume Register 484, Bank Register 50, Segment/Transaction Register 502 and Status Register 504 are all updated by handheld 32.

Registers Save 1-Save 7 (486, 488, 490, 492, 494, 496, 498), are general purpose registers used by the script writer to store data, for example, input assigned by the programmer with the Save Into response option. These registers can store viewer input for later use or text that a script writer wants to display in a message or question. A script writer may want to ask a question, store a viewer's answers in a register, and then use the stored answer for a branching condition. For example, the interactive program may have a question asking which team will win the game, San Francisco Giants or Atlanta Braves? The script writer could then choose the Save Into response option which causes, for example, a 1 to be stored in Save2 488 if the viewer selected the San Francisco Giants, or a 2 to be stored in Save2 488 if the viewer selected the Atlanta Braves. The script would include a branching instruction so that if Save2 contained a one, the message on handheld display 398 would be "The Giants are great hitters, watch for home runs!" Or, if Save2 contained a 2, the message on display 398 would be, "The Braves have great pitching, watch for a low scoring game!"

For every question created in the authoring system for which points are awarded to viewers, handheld 32 usually updates at least four registers. The following example, using FIG. 15, demonstrates what is stored in various registers after asking a yes/no question. In row 510, a 25 point yes/no question is asked, "Do lions hibernate?" Handheld 32 displays the question and then waits for the viewer to enter an answer. The viewer's input will be stored in the Input Register. If the viewer enters the correct answer, 25 points will be loaded into the Points Register 480. For purposes of this example, this script is the second game of a series (since the first game ended with a score of 500, the Cume Register 484 is equal to the Score Register 482 plus 500) and the viewer's current score is 75 (thus, Score Register 482=75 and Cume Register=575). Row 512 occurs when the viewer enters a 1 representing a yes, which is the wrong answer. Handheld 32 displays the message, "No, lions live in warm climates and have no need to hibernate." Since the wrong answer was selected, no points are earned. Thus, the score and cume registers are not incremented. Row 514 represents when the viewer enters a 2, representing a "no" which is the correct answer; therefore, handheld 32 will display the message, "Right! 25 pts. " The Points Register 480 is loaded with 25. The Score Register 482 is then updated by the addition of the Points Register 484. The equation is new Score Register value=old Score Register value plus Points Register. In this case, Score Register=75 pts.+25 pts.=100 pts. The Cume Register 484 is similarly updated by the addition of 25 pts.

In summary, handheld 32 displays a question and then waits for the viewer to enter an answer. The answer is stored in the input register. Handheld 32 then updates the other registers based upon the values stored in the input register. After the registers are updated, new transactions can be presented to the viewer.

Table 1 shows a partial memory allocation for handheld 32. As described above, information is stored in the handheld 32 in programmer tables. There are three types of programmer tables: secured programmer tables, unsecured programmer tables and event specific programmer tables. Unsecured programmer tables have all of the information stored in RAM 390. Secured programmer tables have some of the information stored in RAM 390 and some of the information stored in an EEPROM inside secure microprocessor 392. An event programmer table has some information stored in RAM 390 and some information stored in the EEPROM. Secured programmer tables are programmer tables with registers that cannot be accessed or tampered with by a viewer attempting to cheat. When interactive programs award prizes of value, a programmer may want to use a secured programmer table to prevent tampering or cheating. If the game is played without any incentive for cheating, for example no prizes, an unsecured programmer table could be used.

As described above, programmer tables are assigned to affiliates. For example, they could be sold on a per programmer table basis. Thus, a given affiliate may buy five or ten programmer tables to use for all of its interactive programs. However, there may be an occasion where an affiliate needs to use to a programmer table for a particular interactive program but has no programmer tables available in its own set of prepurchased tables. Or, a first time viewer may want to try an interactive program on an incremental basis. Thus, an affiliate can buy an event programmer table which is a programmer table available only for one particular event. The most useful function for event specific programmer tables is in conjunction with pay-per-play events. For example, a viewer might be given the opportunity to buy the right to participate in a pay-per-play interactive program in conjunction with a pay-per-view boxing match. In this situation, the viewer would order the pay-per-play event and receive an access code to activate the specific event programmer table, which enables the viewer to participate in the pay-per-play interactive program.

Table 1 shows the preferred maximum number and allocation of the three types of programmer tables with respect to RAM 390 and the EEPROM inside secure microprocessor 392. The column labeled "EE Bytes" represents bytes of data stored in the EEPROM of secured microprocessor 392. The column labeled "RAM Bytes" represents bytes of data stored in RAM 390. In the preferred embodiment, there are 204 secured programmer tables, there are 182 unsecured programmer tables and 20 event tables.

For example, Table 1 shows that there are 204 secured programmer tables, with each programmer table having a Group Register which is 10 bits wide. Therefore, 255 bytes of the EEPROM in secured microprocessor 392 are used for secured programmer table Group Registers.

TABLE 1

| Purpose | Quantity | Size | RAM Bytes | EE Bytes |
|---|---|---|---|---|
| Secured Tables: | | | | |
| Group # | 204 | 10 bits | | 255 |
| Unit # | 204 | 4 bits | | 102 |
| Mailbox # | 204 | 14 bits | | 357 |
| Score | 204 | 3 Bytes | | 612 |
| Cume | 204 | 3 Bytes | | 612 |
| Save 1–7 | 204 | 21 Bytes | 4284 | |
| Bank | 204 | 3 Bytes | | 612 |
| Status | 204 | 1 Byte | | 204 |
| Seg/Trans | 204 | 3 Bytes | 612 | |
| Unsecured Tables: | | | | |
| Group # | 182 | 10 bits | 228 | |

TABLE 1-continued

| Purpose | Quantity | Size | RAM Bytes | EE Bytes |
|---|---|---|---|---|
| Unit # | 182 | 4 bits | 91 | |
| Mailbox # | 182 | 14 bits | 319 | |
| Score | 182 | 3 Bytes | 546 | |
| Cume | 182 | 3 Bytes | 546 | |
| Save 1–7 | 182 | 21 Bytes | 3822 | |
| Bank | 182 | 3 Bytes | 546 | |
| Status | 182 | 1 Byte | 182 | |
| Seg/Trans | 182 | 3 Bytes | 546 | |
| Event Tables: | | | | |
| Group # | 20 | 10 bits | | 25 |
| Unit # | 20 | 4 bit | | 10 |
| Mailbox # | 20 | 14 bits | | 35 |
| Score | 20 | 3 Bytes | | 60 |
| Cume | 20 | 3 Bytes | | 60 |
| Save 1–7 | 20 | 21 Bytes | 420 | |
| Bank | 20 | 3 Bytes | | 60 |
| Status | 20 | 1 Byte | | 20 |
| Segf Trans | 20 | 3 Bytes | 60 | |

VIII. Handheld Sequencing

Handheld 32 uses the mailbox number, group number, unit number, segment number, transaction number, time stamp enable and cheater bit in order to ensure that the viewer is playing the transactions in the proper sequence. Sequence is important for two reasons. First, monitoring the sequence of transactions can be used to detect cheating. Second, if for any reason a transaction is missed by handheld 32 (e.g., data loss or a viewer was surfing or grazing) it is desired that handheld 32 not continue processing transactions in that segment. For example, if the question in a sequence of question-answer-scoring is missed, handheld 32 should not wait for the response because the viewer does not know that handheld 32 is waiting for an answer, nor would there be an answer to score. Handheld 32 should remain idle until the start of the next sequence.

The following examples help describe how handheld 32 sequences through an interactive program and updates the appropriate registers. Most of the examples have two columns followed by an explanation. The left column is certain data associated with a new transaction as compared to the previous transaction. The right column shows the effect that the data in the left column has on a programmer table.

EXAMPLE 1

| Mailbox # | Same | Score =Updated |
|---|---|---|
| Group # | Same | Cume =Updated |
| Unit # | Same | Sav1–Sav7 =Updated |
| | | CB =Same |

In this first example, the transaction data is referencing the same Mailbox Number, Affiliate Number, Group Number, and Unit Number as the previous transaction. Therefore, this transaction will use the same programmer table as the previous transaction. The current transaction is the next transaction in the same game as the previous transaction. Thus, the programmer table is maintained and updated accordingly.

EXAMPLE 2

| Mailbox # | Different |
|---|---|
| Group # | Don't Care |

| | | |
|---|---|---|
| Unit # | Don't Care | |
| Segment # | Don't Care | |
| Transaction # | Don't Care | |
| Time Stamp Enable | Don't Care | |

This transaction has a different Mailbox Number than the previous transaction; therefore, handheld 32 uses a different programmer table.

EXAMPLE 3

| | | |
|---|---|---|
| Mailbox # | Same | Score =0 |
| Group # | Different | Cume =0 |
| Unit # | Same | Sav1–Sav7 =0 |
| | | CB =0 |

In this situation, handheld 32 is using the same programmer table; however, a new interactive program (or series) is starting due to the new group number. Since the new transaction is part of a new series, the Score, Cume, Point and Save Registers are reset to zero and then updated with the scores from the new transaction.

EXAMPLE 4

| | | |
|---|---|---|
| Mailbox # | Same | Score =0 |
| Group # | Different | Cume =0 |
| Unit # | Different | Sav1–Sav7 =0 |
| | | CB =0 |

As in the previous example, a new program or series is starting that uses the same programmer table as the previous transaction.

EXAMPLE 5

| | | |
|---|---|---|
| Mailbox # | Same | Score =0 |
| Group # | Same | Cume =Updated |
| Unit # | Different | Sav1–Sav7 =Updated |
| | | CB =Same |

This is an example where the new transaction is using the same programmer table and is part of same series as the previous transaction, but has a different unit number. Thus, the new transaction is the next game in the series. For example, it may be a new game in the World Series. Thus, handheld 32 should zero out the Points and Score Registers but maintain the Cume Register.

EXAMPLE 6

| | | |
|---|---|---|
| Mailbox # | Same | Score =Same |
| Group # | Same | Cume =Same |
| Unit # | Same | Sav1–Sav7 =Same |
| Segment# | Backward Sequence | CB =Same |
| Transaction # | ! =1 | |
| Time Stamp Enable | True | |

In this example, the segment number has changed but in backwards sequence. For example, handheld 32 was processing segment 7; however, the new transaction is from segment 5. Since the transaction number is not equal to 1, handheld 32 is receiving this transaction in the middle of a sequence. This may be an example of a viewer who taped a portion of an interactive program and is attempting to replay part of the program. Thus, handheld 32 will ignore this transaction, and wait for the beginning of the next sequence. Ignoring the transaction includes not presenting the transaction and not updating any programmer tables. Therefore, the programmer table will not be updated with the new sequence number; thus, the next transaction received by handheld 32 is also likely to be out of sequence. The next transaction with a transaction number of 1 is likely to be analogous to Example 8.

EXAMPLE 7

| | | |
|---|---|---|
| Mailbox # | Same | Cume =Frozen |
| Group # | Same | Score =0 |
| Unit # | Same | Sav1–Sav7 =Updated |
| Segment # | Backward Sequence | CB =1 |
| Transaction # | 1 | |
| Time Stamp Enable | True | |

This situation is similar to the previous example except the transaction number is 1. Therefore, handheld 32 would conclude that the transaction is at the beginning of a segment and the segment is out of order. Handheld 32 assumes that the viewer is cheating by taping the interactive program and replaying it. Therefore, the cheater bit is set to 1 which freezes the Cume Register 484. Points Register 480 and Score Register 482 are reset to zero. The transaction is played without effecting the cumulative score.

EXAMPLE 8

| | | |
|---|---|---|
| Mailbox # | Same | Score =0 |
| Group # | Same | Cume =0 |
| Unit # | Same | Sav1–Sav7 =0 |
| Segment # | Backward Sequence | CB =0 |
| Transaction # | 1 | |
| Time Stamp Enable | False | |

This situation is the same as the previous situation, however, the time stamp enable is false. Therefore, even though the viewer is playing out of sequence, Cume Register 484 will not be frozen. Rather, handheld 32 resets the registers and allows the viewer to restart the game. This situation would arise in a children's video or another interactive program where prizes are not awarded and/or cheating is not relevant.

EXAMPLE 9

| | | |
|---|---|---|
| Mailbox # | Same | Score =Same |
| Group # | Same | Cume =Same |
| Unit # | Same | Sav1–Sav7 =Same |
| Segment # | Fwd. out of seq. | CB =Same |
| Transaction # | ! =1 | |
| Time Stamp Enable | True | |

In this situation, the segment number is out of order, and the new transaction is not the first transaction of the segment. Therefore, the viewer is trying to play a segment by entering in the middle of the segment. This transaction may be a response; however, no question was queried to the viewer. Handheld 32 does not present this transaction to the viewer. Handheld 32 will remain idle (from the viewer's point of view) until the beginning of the next segment, where handheld 32 will start presenting transactions to the viewer (see Example 11). This may be the situation where the viewer was initially participating in the interactive game, but temporarily stopped. Perhaps the viewer momentarily changed television channels or stepped away from the television viewing area (e.g. bathroom break). Although the viewer can continue participating, the viewer loses out by losing the potential scoring from the missed transactions.

EXAMPLE 10

| Mailbox # | Same | Score =Updated |
|---|---|---|
| Group # | Same | Cume =Updated |
| Unit # | Same | Sav1–Sav7 =Updated |
| Segment # | Fwd. out of seq. | CB =Same |
| Transaction # | 1 | |
| Time Stamp Enable | True | |

This situation is similar to Example 10 except that the transaction number is 1. Therefore, the viewer has missed some transactions and is now at the beginning of a new segment. Since the transaction is at the beginning of a segment, handheld 32 allows the viewer to play the transaction and, appropriately updates the Score and Cume Registers. As in Example 10, the viewer does not receive any scoring from the missed transactions.

EXAMPLE 11

| Mailbox # | Same | Score =Updated |
|---|---|---|
| Group # | Same | Cume =Updated |
| Unit # | Same | Sav1–Sav7 =Updated |
| Segment # | Same | CB =Same |
| Transaction # | In sequence | |
| Time Stamp Enable | True or False | |

This situation is the norm. The viewer is playing the next transaction in the same segment and all the registers are appropriately updated.

EXAMPLE 12

| Mailbox # | Same | Score =Same |
|---|---|---|
| Group # | Same | Cume =Same |
| Unit # | Same | Sav1–Sav7 =Same |
| Segment # | Same | CB =Same |
| Transaction # | Bck. seq. ! =1 | |
| Time Stamp Enable | True | |

In this situation, the transaction has same segment number but a lower transaction number which is not equal to 1. For example, the previous transaction had a transaction number of 6; however, the current transaction has a transaction number of 4. The viewer most likely attempted to replay a taped transaction. The transaction is ignored. Handheld 32 may start presenting transactions when it receives a transaction with a transaction number of one. Until that time, the registers will not be updated.

EXAMPLE 13

| Mailbox # | Same | Score =0 |
|---|---|---|
| Group # | Same | Cume =Frozen |
| Unit # | Same | Sav1–Sav7 =Updated |
| Segment # | Same | CB =1 |
| Transaction # | Bck. seq. =1 | |
| Time Stamp Enable | True | |

This is the same situation as the previous example except that when the viewer rewound the tape (assuming the viewer videotaped), the tape was rewound to the beginning of the sequence. Thus, the transaction number is 1. Handheld 32 assumes the viewer is trying to cheat; therefore, handheld 32 resets the Score and Points Registers, freezes the Cume Register and sets the cheater bit to 1. The viewer can continue to play the interactive program and update the Score Register, but the viewer's score does not count toward a prize. Because the Cheater Bit (CB) is set to one, the Cume Register is frozen and the viewer would not receive a message to register the viewer's score with operations 34.

EXAMPLE 14

| Mailbox # | Same | Score =0 |
|---|---|---|
| Group # | Same | Cume =0 |
| Unit # | Same | Sav1–Sav7 =0 |
| Segment # | Same | CB =0 |
| Transaction # | Bck. seq. =1 | |
| Time Stamp Enable | False | |

This situation is the same as the situation in example 12, however time stamp enable is set to false. Thus, handheld 32 does not care that the viewer may be cheating. A new game is started.

EXAMPLE 15

| Mailbox # | Same | Score =Same |
|---|---|---|
| Group # | Same | Cume =Same |
| Unit # | Same | Sav1–Sav7 =Same |
| Segment # | Same | CB =Same |
| Transaction # | Fwd. out of seq. | |
| Time Stamp Enable | True or False | |

In this situation the viewer is playing the interactive program out of sequence. The viewer may have taped and is jumping ahead, the viewer may have switched channels (surfed) and now has come back, or the viewer may have momentarily left the television viewing area and missed a transaction. Since handheld 32 knows it is playing a transaction out of sequence within the same segment, the handheld merely ignores the transaction and waits for a new transaction with a transaction number of 1. The registers are not updated.

EXAMPLE 16

| Mailbox # | Same | Score =Same |
|---|---|---|
| Group # | Same | Cume =Same |
| Unit # | Same | Sav1–Sav7 =Same |
| Segment # | Same | CB =1 |
| Transaction # | Same | |
| Time Stamp Enable | True or False | |

In this situation the viewer is attempting to replay the exact same transaction again. Handheld 32 simply ignores the transaction. The cheater bit is set to one because the viewer is attempting to cheat.

It follows from the above description that, even with interleaved games and the viewer's entering and leaving the interactive program at various times, the viewer's reactions and answers to all games in which the viewer participates are stored in some form by handheld 32 and later can be reported to a central processing station (operations 34).

The interactive system discussed above is used to demonstrate one platform for using the time stamping security system described below. It is contemplated that the time stamping security system of the present system could be used with various other types of systems.

IX. Time Stamps

Figure 16:
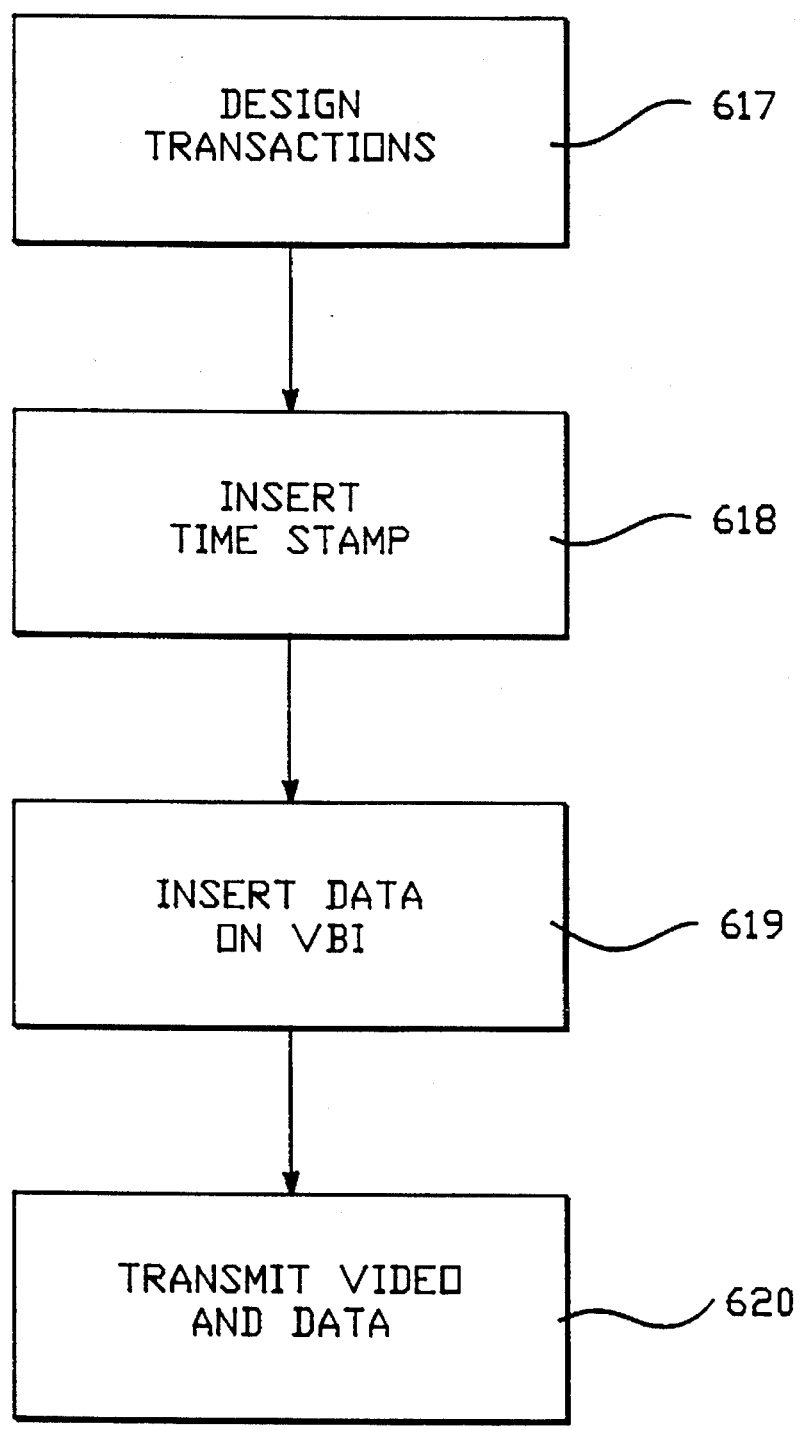
FIG. 16 is a flowchart explaining how time stamps are inserted into the interactive data.

Time stamp 326 is inserted into the interactive data by the VBI card 20 using the method depicted in FIG. 16. The first step is to design a transaction or segment (617). The second step is to insert a time stamp into the transaction data (618). Alternatively, the time stamp could be inserted once for each segment. Time stamp 326 should represent the current date/time that the time stamp 114 is inserted into the VBI. The third step includes inserting the interactive data into the VBI (619). It is also contemplated that time stamp 326 could be inserted directly into existing VBI data in a television signal. Finally, the video and data are transmitted to the remote locations (620).

The system for preventing cheating is based on relative times. Handheld 32 receives interactive data having a time stamp based on a real time clock 267. Microprocessor 388 of handheld 32 compares time stamp 326 to handheld clock 389 to determine a difference (or "delta"). The "deltas" for two successive transactions are then compared in order to determine which of the transactions (or segments) are delayed with respect to the other. The score from the transactions that are not delayed are added to the cumulative score. After the game is complete, or at some other stopping point, a viewer's cumulative score, along with a "delta" and a current reading of handheld clock 389, are registered with operations 34. The difference between the operations clock (which must be synchronized to real time clock 267 in VBI card 20) and handheld clock 389 is compared to the transmitted delta in order to verify the cumulative score.

Figure 17:
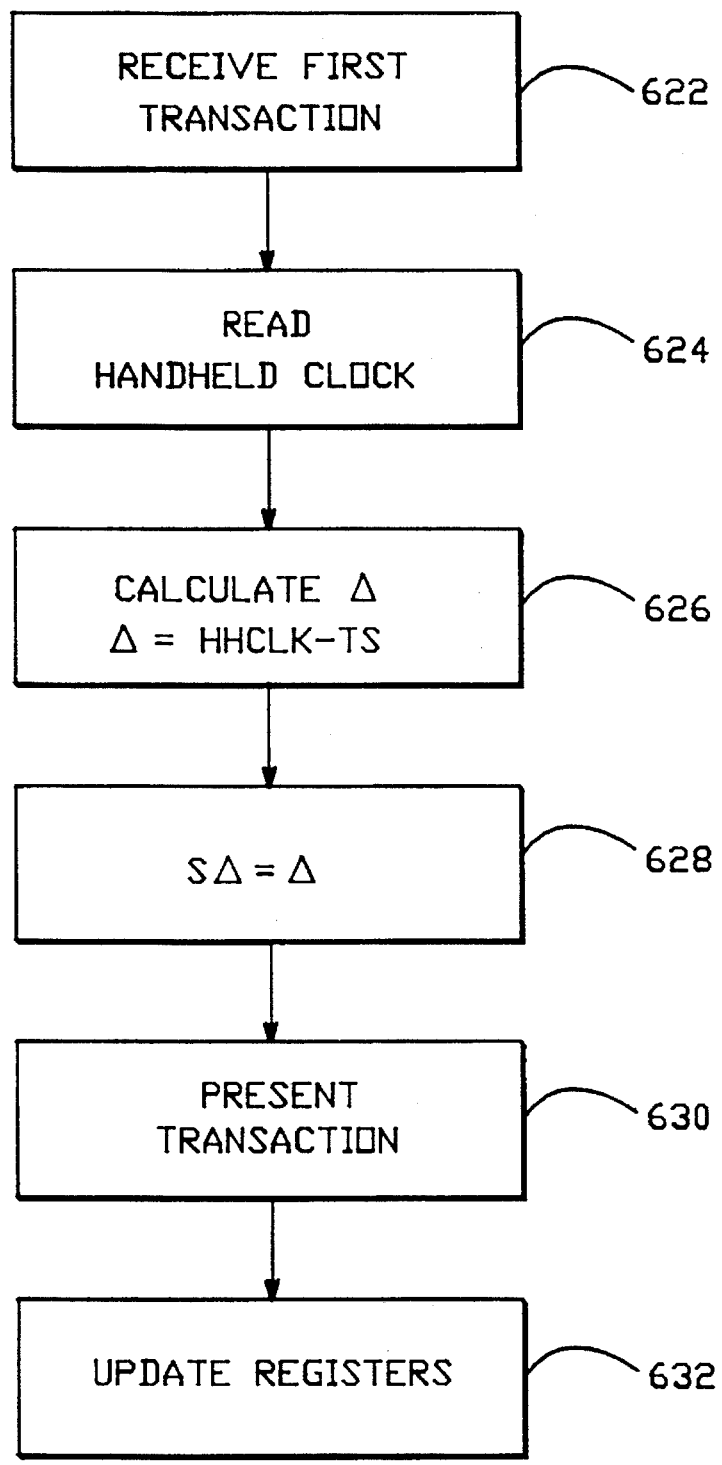
FIG. 17 is part 1 of a flowchart explaining how time stamps are used to provide security on an interactive television system.

A more detailed discussion of the method for using time stamps to prevent cheating will be discussed in reference to the flowchart shown in FIGS. 17–19. First, handheld 32 would receive the first transaction (622). Clock 389 in handheld 32 is read at the time the transaction is received (624). Time stamp 326 (TS) contained in the transaction data is compared to handheld clock 389 ("HHCLK") (626). A "delta" (Δ) is calculated, the "delta" being equal to the time read from handheld clock 389 minus the time stamp (626). The "delta" is then stored (628), this is called a "stored delta" (SΔ). The "stored delta" may be updated as different transactions are processed. The transaction is then presented to the viewer (630). Presenting the transaction may (but is not limited to or required to) include presenting a question, waiting for or receiving an answer, displaying the correct answer or scoring a response.

Figure 18:
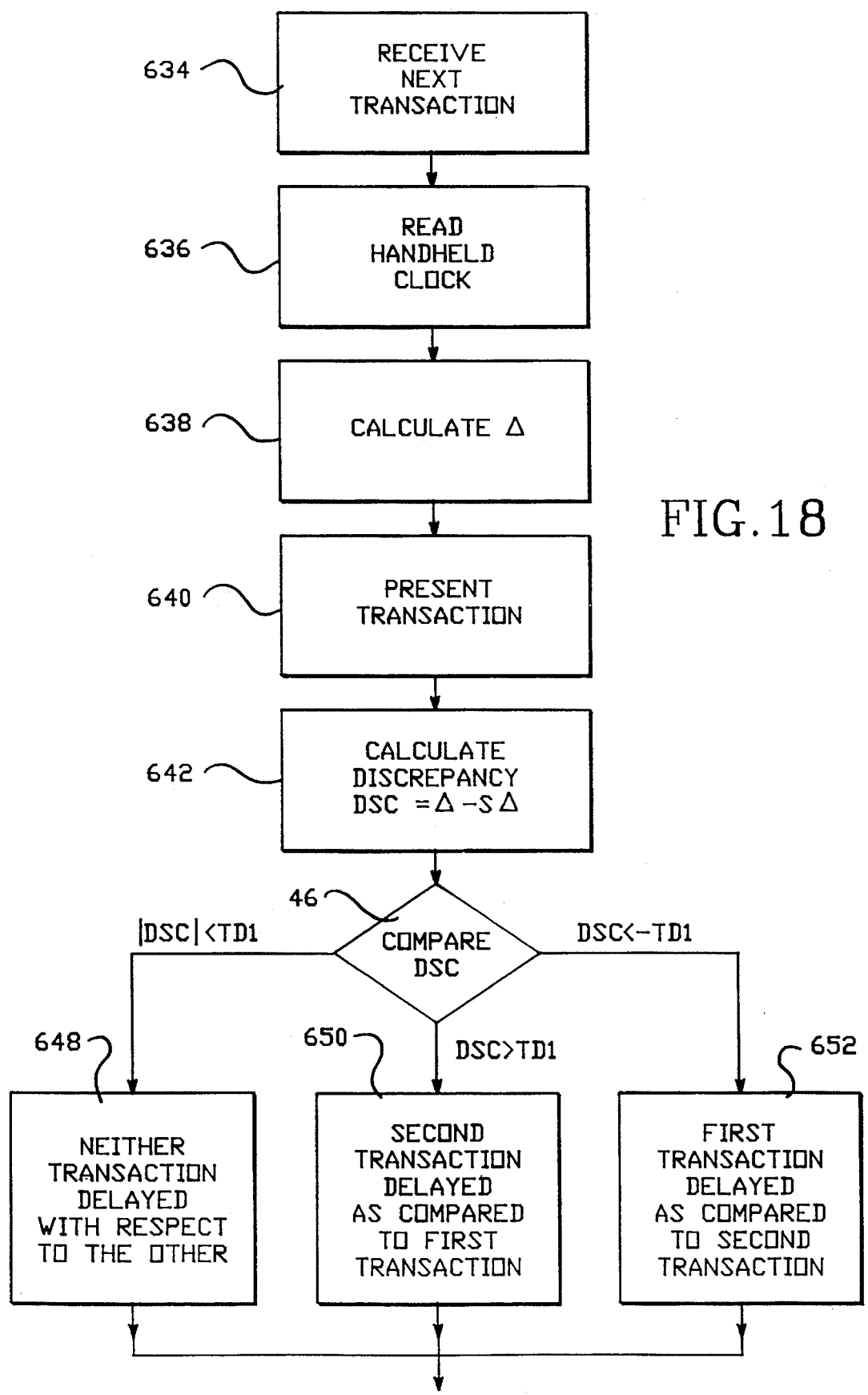
FIG. 18 is part 2 of a flowchart explaining how time stamps are used to provide security on an interactive television system.
Figure 19:
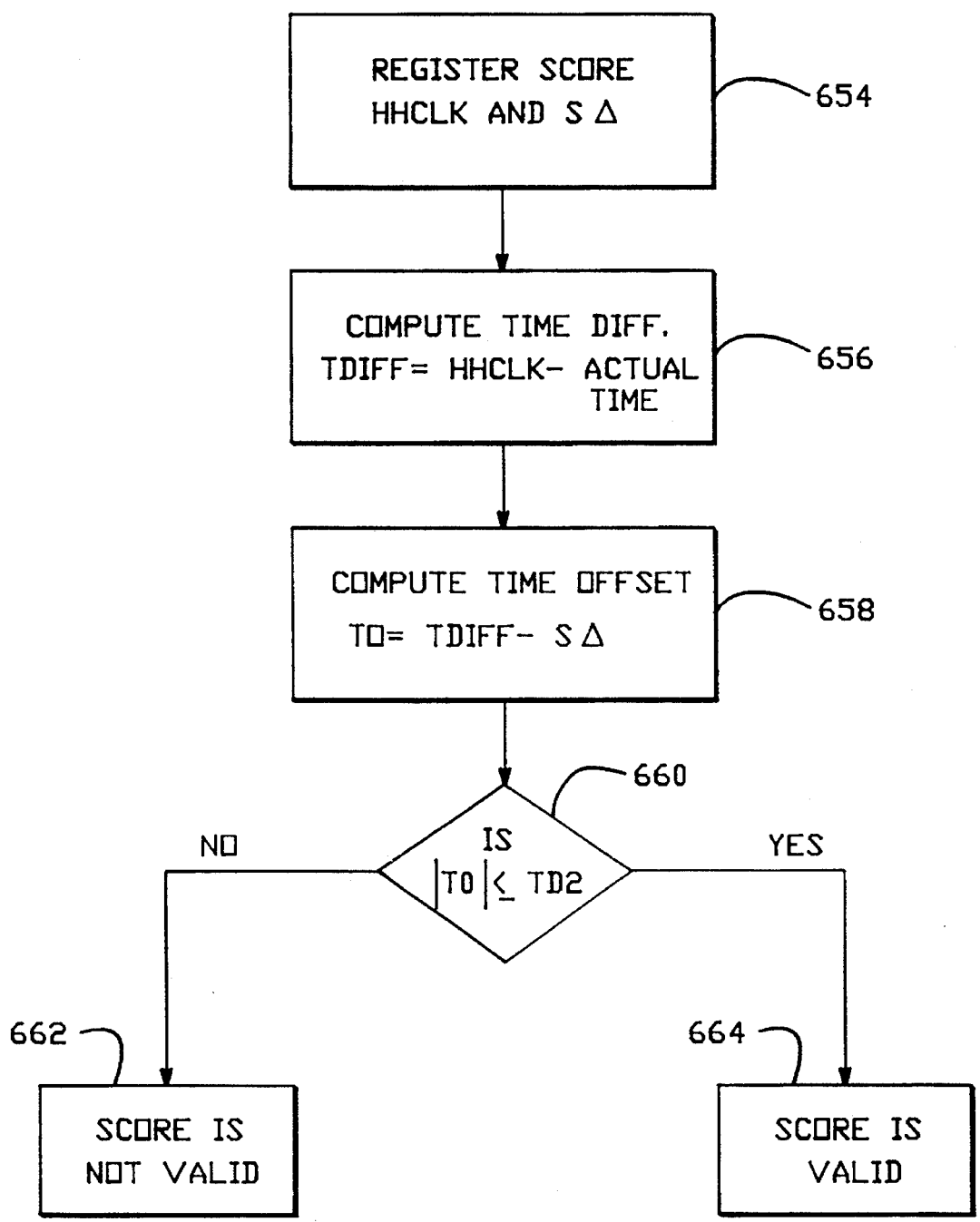
FIG. 19 is part 3 of a flowchart explaining how time stamps are used to provide security on an interactive television system.

The second transaction is then received (634) (see FIG. 18). Handheld clock 389 is read at the time the second transaction is received (636). The "delta" for the second transaction is also calculated (638) and the second transaction is presented to the viewer (640). At this point, handheld 32 calculates a "discrepancy" (642). The "discrepancy" (DSC) is equal to the "delta" of the current transaction, which in this case is the second transaction, minus the "stored delta."

The "discrepancy" indicates whether one of the transactions is delayed with respect to the other transaction. A non-zero "discrepancy" would indicate a difference in the delay of the two transactions. A "discrepancy" greater than zero would indicated that the second transaction was delayed as compared to the first transaction. A "discrepancy" less than zero would indicate that the first transaction was delayed as compared to the second. If the "discrepancy" is zero, then the transactions were broadcast with the same delay.

Additionally, handheld 32 can be designed to allow for clock drift. For example, although the first transaction and the second transaction could be sent with the exact same delay, because clock 389 could drift the "deltas" may be slightly different. Thus, the "discrepancy" is compared to an allowable amount of drift between transactions, rather than zero. If this time drift constant (TDI) is, for example, 3 seconds, the transactions would be accepted as having no difference in delay time if the "discrepancy" was less than 3 seconds.

If the "discrepancy" was greater than the first time drift constant (TD1), for example, if we allowed 3 seconds as our time drift constant and the "discrepancy" was 4 seconds, then handheld 32 could conclude that the second transaction was delayed as compared to the first transaction (650). Since the second transaction was delayed, the cumulative game score should not be updated with the score from the second transaction. Thus, the Cume Register 484 would be frozen.

If the absolute value of the "discrepancy" was less than the first time drift constant then neither transaction was delayed as compared to the other and the score from the second transaction could be added to the cumulative score (648). If the "discrepancy" is less than the negative of the first time drift constant, handheld 32 would conclude that the first transaction was delayed as compared to the second transaction (152). For example, if the first time drift constant was 3 seconds and the "discrepancy" was negative 5, meaning that the stored delta was 5 seconds greater than the delta of the second transaction, handheld 32 would conclude that everything before the second transaction was delayed. This conclusion is made because the "stored delta" represents the delta of the last "live" transaction. Accordingly, the Cume Register 484 and Score Register 482 would be reset to zero and updated as per the second transaction.

If handheld 32 concluded that the second transaction was delayed as compared to the first transaction, then the "stored delta" remains the "delta" of the first transaction. If both transactions have the same delay, the "stored delta" is updated to equal the "delta" of the second transaction. If the first transaction was determined to be delayed with respect to the second transaction, then the "stored delta" is updated to equal the "delta" for the second transaction.

As discussed above with respect to FIG. 7, parameters 328 include a time stamp enable (TSE). When TSE is zero, the handheld ignores the time stamp and does not compute "delta".

As discussed above, handheld 32 sets the cheater bit (CB) to one if either transaction was delayed as compared to the other (e.g., "discrepancy"≠0). Once CB is set to 1, the Cume Register 484 would be frozen. That is, once a user tries to play a delayed transaction, the user will be penalized for the entire series by not allowing the user to accumulate any more points regardless of whether the user is playing live or delayed transactions.

One alternative embodiment includes a handheld without a cheater bit. Rather than freezing the Cume Register (or the Score Register), the Cume Register will only be updated with non-taped transactions. For example, if the first transaction was delayed as compared to the second transaction, before scoring the second transaction, the Cume Register will be reset to zero and then updated with the score from the second transaction. The Cume register will continue to be updated with scores from future non-taped transactions.

If the second transaction was delayed as compared to the first transaction, the Cume Register will be updated with the score from the first transaction but not the second transaction. Additionally, the Cume Register will be updated with the score of any future transaction which is not delayed as compared to the first transaction.

If neither transaction was delayed as compared to the other, the Cume register will reflect the scores from both transactions. As discussed below, at the end of the game the cumulative score will then be checked to determine if the entire interactive program was inappropriately delayed.

This alternative embodiment allows a viewer who is participating in a series to "replay" part of a game without affecting the cumulative score. Or, if a viewer missed part of an interactive program, the viewer can play the missed portion of the program (if the viewer had the program videotaped) without affecting the cumulative score.

At the end of the game, in the preferred embodiment and the alternative embodiment, handheld 32 will display the viewer's cumulative score, the handheld clock time, the "stored delta", and a message directing the viewer to register the viewer's score. The viewer would then register the cumulative score, handheld clock time and "stored delta", by any of the means discussed above (654). Instead of displaying the cumulative score, the handheld clock time and the stored delta, handheld 32 can display a code word which is some encrypted combination of the three numbers.

Operations would compute a "time difference" (TDIFF). The "time difference" is the difference between the operations clock and the handheld clock 389 (656). "Time offset" (TO) is then calculated to be equal to the difference between "time difference" and the transmitted "stored delta" (658). "Time difference" should equal the "stored delta" if the score was generated by a live feed (660). Thus, if "time offset" is equal to zero, then the transactions were presented from a live feed and the cumulative score is valid (664). If time offset is not zero, then the entire set of transactions are considered delayed and the score is not valid (662).

As discussed above, the clock 389 on handheld 32 could drift. Thus, the score may be valid even though "time offset" is not quite zero, but close to zero. To compensate for this, "time offset" is compared to a second time drift constant (TD2). If the absolute value of "time offset" is less than the second time drift constant, the score is valid; else, the score is not valid. Furthermore, comparing "time offset" to a time drift constant, rather than to zero, allows for transmission time delays.

Several examples will be given to illustrate various scenarios using the above-described security system. Each example uses a two-segment interactive program, each segment having one transaction. In each case, the cumulative score is registered after the game is played.

X. Examples

A. EXAMPLE 1: Normal Operation, Handheld Clock 389 Synchronized

In this example, the viewer simply plays the game as it is broadcast and then registers the cumulative score. It is assumed that the internal handheld clock 389 is perfectly synchronized to real time clock 267 on VBI card 2. The first transaction has a time stamp of 10:05:30. Handheld clock 389 also has this time. The difference "delta", between these times is zero so the handheld 32 saves zero as the "stored delta".

The second transaction has a time stamp 10:10:45. The handheld clock 389 also has this time. The delta time is zero. This new "delta" is compared to the old "stored delta" to produce a "discrepancy." Since the discrepancy is zero, there is no difference in transaction delay and transaction processing continues as usual.

The score is registered at 10:15:00. At this time, the handheld clock time and "stored delta" are registered with the operator. The operator compares the operations clock with the handheld clock 389. The difference, "time difference," which is zero in this example, should match the "stored delta" if the score was generated from a live feed. Since time offset is zero in this case, the cumulative score is valid.

B. Example 2: Normal Operation, Handheld Clock 78 Not Synchronized

In this example, assume that the handheld clock 389 has drifted by 20 seconds. The first transaction is received with a time stamp of 10:05:30. Handheld clock 389 reads 10:05:10. The difference, "delta", is -00:00:20 which is saved as the "stored delta".

The second transaction received has a time stamp of 10:10:45. Handheld clock 389 reads 10:10:25. The new "delta" is -00:00:20 which agrees exactly with the old "delta" to produce a time "discrepancy" of 00:00:00. This indicates no difference in the delay of the two transactions.

The cumulative score is registered at 12:15:00. At this time, the handheld clock 389 and "stored delta" are passed to the operator. The operator compares the operations clock with the handheld clock 389. "Time difference" is 00:00:20. Thus, "time offset" is zero indicating a valid cumulative score. This illustrates the fact that the handheld does not have to be synchronized.

C. Example 3: Taped Delay Operation

In this example, the first transaction has a time stamp of 10:05:30. Handheld clock 389 has 11:05:30 producing a "delta" of 01:00:00.

The second transaction has a time stamp of 10:10:45. The new "delta" is 01:00:00 creating a "discrepancy" of 00:00:00. This indicates no difference in the delay of the two transactions.

The cumulative score is registered at 12:15:00. The operator compares the operations clock (12:15:00) with the handheld clock 389 (12:15:00) which yields 00:00:00 (the two clocks are synchronized). "Time offset" is calculated and found to be non-zero (−01:00:00). This indicates that the cumulative score was generated from a delayed signal of one hour, and the cumulative score is invalid.

D. Example 4: Taped Delay Operation With Varying Delays

In this next case, we will examine two delayed transactions with different delays. The first transaction with a time stamp of 09:05:30 is received one hour late at 10:05:30. Handheld clock 389 has 10:05:30 yielding a new "delta" of 01:00.00.

The second transaction with a time stamp of 09:40:45 is received 30 minutes late at 10:10:45. The new "delta" is 00:30:00 creating a "discrepancy" of −00:30:00. This indicates a difference in the delay of the two transactions. Since the "discrepancy" is negative, the first transaction was received delayed relative to the second transaction. In other words, the first transaction is assumed to be delayed and the second transaction is assumed to be live (this, of course, is not the case since both transactions were delayed). "Stored delta" is taken from the so called live transaction and is set to 00:30:00.

The score is registered at 12:15:00. The operator compares the operations clock (12:15:00) with the handheld clock 389 (12:15:00) which yields a "time difference" of 00:00:00. "Time offset" is calculated and found to be non-zero (−00:30:00). This indicates that the score was generated from a delayed signal of 30 minutes and the score is invalid.

E. Example 5: Drifting Handheld Clock Operation

The first transaction with a time stamp at 10:05:30. The handheld clock has 10:05:30 yielding a new "delta" of 00:00:00.

The second transaction with a time stamp of 10:10:45. The handheld clock has 10:10:44 yielding a new "delta" of −00:00:01 (the handheld clock has drifted by one second). The "discrepancy" is −00:00:01. Since we realize that the handheld clock will drift and we wish to tolerate a certain amount of drift, the "discrepancy" is not compared to zero. Instead, the absolute value of "discrepancy" is compared to the allowable amount of drift between transactions. If this allowable amount is, say, three seconds, the transaction would be accepted as having no difference in delay time. The new "stored delta" would be the "delta" from the current transaction (−00:00:01).

The score is registered at 12:15:00. The operator compares the operations clock (12:15:00) with handheld clock 389 (12:14:55) which yields a "time difference" of −00:00:05. "Time offset" is calculated and found to be non-zero (−00:00:04). As above, we wish to tolerate a certain amount of handheld clock drift. Instead of comparing "time offset" to zero, we compare the absolute value of "time offset" to the allowable amount of drift. If this allowable drift is, say, 10 seconds, the "time offset" would be less than the time drift constant and the score is valid. Allowable amounts of drift could be determined not in units of seconds, but instead in units of parts per million (PPM).

Although the previous description of the security system is described with respect to an interactive television system, the security system could have other applications. For example, the security system could be used with pay-per-view TV. The pay-per-view operator would list the events that could be subscribed to and the viewer could select which events they want, and only pay for the selected events. The viewer may choose a certain movie to be televised in the viewers's home. The viewer could record the movie using a VCR, or other recording or storage method, and view the movie as often as desired without paying additional fees. It is contemplated that the security method described in this application can be used to prevent the viewer from replaying the movie without paying additional fees by checking embedded time stamps.

Other objects, aspects and advantages of the invention can be obtained from a view of the claims and the appended figures.

It is to be understood that other embodiments of the present invention can be constructed and be within the spirit and scope of the present invention.

What is claimed is:

1. A method for providing security through time stamping, comprising the steps of:
   receiving, at a receiving location, data having a time stamp based on a first clock;
   computing a first difference between a time represented by said time stamp and a first time generated by a second clock;
   calculating a second difference between a second time generated by said second clock and a time generated by an operations clock; and
   comparing said first difference to said second difference.

2. A method according to claim 1, wherein:
   said operations clock is said first clock.

3. A method for providing security through time stamping, comprising the steps of:
   receiving, at a receiving location, a first set of data having a first time stamp based on a first clock;
   computing a first difference between a time represented by said first time stamp and a first time generated by a second clock;
   receiving a second set of data having a second time stamp based on said first clock;
   computing a second difference between a time represented by said second time stamp and a second time generated by said second clock; and
   comparing said first difference with said second difference to determine whether said second set of data is delayed as compared to said first set of data.

4. A method according to claim 3, further including the steps of:
   calculating a third difference between a third time generated by said second clock and a time generated by an operations clock;
   calculating a fourth difference by comparing said third time difference to said second time difference if said second set of data was determined not to be delayed as compared to said first set of data, and comparing said third time difference to said first time difference if said second set of data was determined to be delayed as compared to said first set of data;
   determining whether said fourth difference is greater than a preset time drift constant.

5. A method according to claim 4, wherein said step of comparing allows for said second clock to drift with respect to one of either said first clock or said operations clock.

6. A method according to claim 4, wherein the step of comparing said first difference to said second difference includes determining a discrepancy by subtracting said first difference from said second difference, so that determining said discrepancy to be greater than a time drift constant indicates that said second set of data is delayed as compared to said first set of data.

7. A method according to claim 4, wherein said operations clock and said first clock are synchronized.

8. A method according to claim 4, wherein said operations clock is said first clock.

9. A method for providing security, comprising the steps of:
   receiving, at a receiving location, a first set of data having a first time stamp based on a first clock;
   computing a first difference between a time represented by said first time stamp and a time generated by a second clock;
   receiving a second set of data having a second time stamp based on said first clock;

computing a second difference between a time represented by said second time stamp and a time generated by said second clock;

comparing said first difference with said second difference to determine whether said second set of data is delayed as compared to said first set of data and whether said first set of data is delayed as compared to said second set of data;

calculating a third difference between a time generated by said second clock and a time generated by an operations clock;

testing whether said first set of data is valid by comparing said third time difference to said first time difference if said first set of data was determined not to be delayed as compared to said second set of data; and testing whether said second set of data is valid by comparing said third time difference to said second time difference if said second set of data was determined not to be delayed as compared to said first set of data.

10. A method according to claim 9, wherein the step of testing whether said second set of data is valid allows for said second clock to drift with respect to said first clock.

11. A method according to claim 9, wherein the step of comparing said first difference with said second difference includes determining a discrepancy by subtracting said first difference from said second difference, so that if said discrepancy is greater than a time drift constant, said discrepancy indicates that said second set of data is delayed.

12. A method according to claim 9, wherein said operations clock and said first clock are synchronized.

13. A system for securing interactive television using time stamps, comprising:

a receiver capable of receiving at least two sets of interactive data, each set of interactive data having a time stamp based on a first clock;

a second clock;

comparison means for comparing times represented by said time stamps to times generated by said second clock;

delay means, based on said comparing performed by said comparison means, for determining whether a first set of said interactive data is delayed as compared to a second set of said interactive data;

presentation means, based on said second set of interactive data, for presenting a transaction to a viewer;

verification means, based on said second clock and said comparing performed by said comparison means, for determining if said sets of interactive data were delayed.

14. A system according to claim 13, wherein the verification means is at a central location; and further including means for communicating between said delay means and said central location.

15. A system according to claim 13, wherein said verification means determines a time difference equal to a time generated by said second clock subtracted from a time generated by said first clock and uses said time difference to determine whether said interactive data was delayed from its broadcast.

16. A system for preventing cheating using time stamps, comprising:

means for receiving interactive data over a period of time, said interactive data including a first set of interactive data having a first time stamp and a second set of interactive data having a second time stamp, said first and said second time stamps based on a first clock;

a second clock;

delay comparison means for comparing times generated by said second clock to times represented by said first and second time stamps and for determining if said first set of data is delayed as compared to said second set of data and if said second set of data is delayed as compared to said first set of data; and means for determining whether at least one set of said interactive data was delayed.

17. A system according to claim 16, wherein said delay comparison means includes means for computing a first difference between a time represented by said first time stamp and a time generated by said second clock and for computing a second difference between a time represented by said second time stamp and a time generated by said second clock; and means for comparing said first difference with said second difference to determine whether said second transaction is delayed as compared to said first transaction.

18. A system according to claim 16, wherein said means for determining includes:

means for calculating a third difference between a time generated by said second clock and a time generated by a third clock, and means for comparing said third difference to said second difference if said second transaction was determined not to be delayed as compared to said first time difference and for comparing said third difference to said first difference if said second transaction was determined to be delayed as compared to said first difference.

19. A method for preventing cheating using time stamps, comprising:

inserting a time stamp, based on a first clock, into a first set of interactive data;

sending said first set of interactive data to a remote location, said remote location having a remote clock so that a first delta can be determined for said first set of interactive data, said first delta being equal to a difference between a time represented by said time stamp and a time generated by said remote clock so that said first delta of said first set of interactive data can be compared to a second delta of a second set of interactive data to determine if said first set of interactive data is delayed as compared to said second set of interactive data;

receiving remote data from said remote location, said remote data including a reading of said remote clock and a remote delta, said remote delta being equivalent to said delta of said second set of interactive data if said second set of interactive data was not delayed as compared to said first set of interactive data else said remote delta being equivalent to said delta of said first set of interactive data;

determining a time difference between said first clock and said reading of said remote clock; and comparing said time difference with said remote delta.

20. A method according to claim 19, wherein said step of comparing includes taking into account time drift for said remote clock.

21. A method for providing security, comprising the steps of:

time stamping a first set of data based on a first time generated by a first clock;

transmitting said data to a remote location;

determining a first difference between the time represented by the time stamp in said first set of data and a first time generated by a second clock;

time stamping a second set of data based on a second time generated by said first clock;

transmitting said second set of data to said remote location;

determining a second difference between the time represented by said time stamp in said second set of data and a second time generated by said second clock;

determining a discrepancy equal to said first difference subtracted from said second difference;

storing a differential value, said stored differential value being equal to said first difference if said discrepancy is greater than a first time drift constant, said differential value being equal to said second difference if said discrepancy is not greater than said first time drift constant;

determining a time difference between a time generated by an operations clock and a time generated by said second clock;

determining an offset equal to a difference between said time difference and said stored differential value so that said first set of data is valid if said offset is less than a second time drift constant and said discrepancy is greater than a negative of said first time drift constant, and said second set of data is valid if said offset is less than said second time drift constant and said discrepancy is less than said first time drift constant.

22. A method according to claim 21, wherein said operations clock and said first clock are synchronized.

23. A method according to claim 21, wherein said first time drift constant is nonzero.

24. A method according to claim 21, wherein said second time drift constant is nonzero.

25. A security system for interactive presentations, comprising:

a receiver, adapted to receive a communication signal and read interactive data from said communication signal, said interactive data including a first set of data and a second set of data, said first set of data includes a first time stamp, said second set of data includes a second time stamp;

a first clock;

at least one processor, in communication with said receiver and said first clock, said at least one processor capable of computing a first difference between a time represented by said first time stamp and a first time generated by said first clock and computing a second difference between a time represented by said second time stamp and a second time generated by said first clock and to compute a third difference between said first difference and said second difference so that said at least one processor determines that said first set of data and said second set of data are not delayed with respect to each other if said third difference is less than a constant.

26. A system according to claim 25, wherein:

said time stamp is based on a second clock; and said security system further includes a transmitter adapted to send said third difference and a third time generated by said first clock to a central office so that a fourth difference can be computed between said third time generated by said first clock and a time generated by an operations clock, with said fourth difference being compared to said third difference.

27. A system according to claim 26, wherein said operations clock and said second clock are different clocks.

28. A system according to claim 25, wherein said constant is non-zero.

29. A system according to claim 25, wherein said at least one processor includes a first processor, and a second secured processor capable of saving data in a secure manner.

30. A system according to claim 25, further including:

a memory, in communication with said at least one processor, adapted to store interactive data;

a display, in communication with said at least one processor;

a keyboard, in communication with said at least one processor, adapted to allow a viewer to input a response to said processor;

wherein said at least one processor presents a first transaction to a viewer based on said first set of data and presents a second transaction to said viewer based on said second transaction.

31. A system according to claim 30, wherein said memory includes a plurality of programmer tables including a first programmer adapted to store data relevant to said first transaction and a second programmer table adapted to store interactive data relevant to a second transaction.

32. A system according to claim 30, wherein said memory includes:

a first location adapted to save a cumulative score of an interactive presentation; and a cheater bit having set and unset states, said first location being adapted to freeze when said cheater bit is set;

wherein said cheater bit is set if said third difference is greater than said constant.

33. A system according to claim 30, wherein said memory includes:

a first location adapted to save a cumulative score of an interactive presentation; and a cheater bit, said first location adapted to reset when said cheater bit is set;

wherein said cheater bit is set if said third difference is greater than said constant.

34. A security system for interactive presentations, comprising:

a receiver capable of receiving interactive data, said interactive data including a plurality of transactions, each transaction including a time stamp;

a clock;

a first processor, in communication with said receiver and said clock, programmed to present said transactions to a viewer; said first processor creates a plurality of deltas by comparing times represented by said time stamps to times generated by said clock when said transaction is received by said receiver, said first processor compares deltas to determine if one transaction is delayed as compared to a second transaction;

a memory, in communication with said first processor, said memory adapted to store a cumulative score for said transactions; and a transmitting unit, in communication with said memory and said clock and said first processor, said transmitting unit adapted to transmit said cumulative score to another location.

35. A system according to claim 34, wherein said transmitting unit transmits said cumulative score, one of said deltas and a clock time value to said another location so that a discrepancy can be calculated equal to a difference between said clock time value and a time generated by an operations clock at said another location, said cumulative score being valid if said discrepancy is within a predetermined range of said transmitted delta.

36. A system according to claim 34, wherein said memory includes a plurality of programmer tables, at least a subset of said plurality of programmer tables include:

a first register for storing game points;

a second register for storing cumulative series points; and a third register for storing sequencing information.

37. A system according to claim 36, further including a second processor for maintaining secure data.

38. A system according to claim 36, further including a keyboard, in communication with said first processor, and a display, in communication with said first processor.

39. A method according to claim 1, wherein:

said first clock is at a first location;

said second clock is at said receiving location, said receiving location being different from said first location;

said operations clock is at a third location different from said second location and said first location; and said operations clock is synchronized with said first clock.

40. A method according to claim 1, wherein:

said first clock is at a first location;

said second clock is at said receiving location, said receiving location being different from said first location;

said operations clock is at said first location; and said operations clock is synchronized with said first clock.

41. A method according to claim 1, wherein:

said time stamp includes a time value generated by said first clock at a time said data was transmitted to said remote location; and said second clock resides at said receiving location.

42. A method according to claim 1, further including the steps of:

reading said second clock after receiving said data and before calculating said first difference;

presenting a transaction based on said data, after calculating said first difference; and transmitting results of said transaction to an operations center, before calculating said second difference.

43. A method according to claim 42, wherein:

said operations clock is at said operations center;

said step of calculating said second difference is performed at said operations center; and said step of comparing is performed at said operations center.

44. A method according to claim 3, wherein said step of comparing determines that said second set of data is delayed as compared to said first set of data if said second difference is greater than said first difference.

45. A method according to claim 3, wherein said first clock is at a location different from said receiving location.

46. A method according to claim 3, wherein:

said second clock is at said receiving location;

said first clock is at a central location, said central location being different from said receiving location; and said operations clock is at an operations location different from said receiving location.

47. A method according to claim 3, further including said steps of:

presenting a first transaction based on said first set of data;

updating a cumulative score, after presenting said first transaction;

presenting a second transaction based on said second set of data;

updating a cumulative score, after presenting said second transaction, if said second difference is less than or equal to said first difference.

48. A method according to claim 3, further including said steps of:

presenting a first transaction based on said first set of data;

updating a cumulative score, after presenting said first transaction;

presenting a second transaction based on said second set of data;

updating a cumulative score, after presenting said second transaction, if said second difference is within a predetermined range of said first difference;

reading a time value of said second clock;

transmitting said cumulative score, said time value and a delta to an operations center, said delta being said second time difference if said second difference is less than or equal to said first difference, said delta being said first time difference if said second difference is greater than said first difference;

calculating, at said operations center, a third difference between said time value and a time generated by an operations clock;

determining that said cumulative score is valid if said third difference is within a predetermined range of said delta.

49. A method according to claim 4, wherein:

said second clock is at said receiving location;

said first clock is at a central location, said central location being different from said receiving location; and said operations clock is at an operations location different from said receiving location.

50. A method according to claim 4, further including said steps of:

presenting a first transaction based on said first set of data;

updating a cumulative score based on said first transaction;

presenting a second transaction based on said second set of data; and updating said cumulative score based on said second transaction if said second difference is within a predetermined range of said first difference.

51. A method according to claim 9, wherein:

said first difference is equivalent to said second difference if said second set of data is not delayed as compared to said first set of data and said first set of data is not delayed as compared to said second set of data.

52. A system according to claim 18, wherein said first clock and said third clock are the same clock.

53. A system according to claim 26, wherein said operations clock and said second clock are the same clock.

54. A method according to claim 1, wherein:

said first clock resides at a location from which said data is transmitted to said receiving location; and said second clock resides at said receiving location.

* * * * *